(12) United States Patent
Engdahl

(10) Patent No.: US 8,670,292 B2
(45) Date of Patent: Mar. 11, 2014

(54) ELECTROMAGNETIC LINEAR ACTUATORS FOR MARINE ACOUSTIC VIBRATORY SOURCES

(75) Inventor: Sven Göran Engdahl, Täby (SE)

(73) Assignee: PGS Geophysical AS, Lysaker (NO)

( * ) Notice: Subject to any disclaimer, the term of this patent is extended or adjusted under 35 U.S.C. 154(b) by 416 days.

(21) Appl. No.: 13/224,782

(22) Filed: Sep. 2, 2011

(65) Prior Publication Data
US 2013/0037342 A1     Feb. 14, 2013

Related U.S. Application Data

(60) Provisional application No. 61/523,211, filed on Aug. 12, 2011.

(51) Int. Cl.
*G01V 1/145* (2006.01)
*G10K 9/13* (2006.01)
*G10K 9/12* (2006.01)

(52) U.S. Cl.
CPC *G10K 9/13* (2013.01); *G10K 9/121* (2013.01); *G01V 1/145* (2013.01)
USPC ............................. 367/175; 367/174; 181/120

(58) Field of Classification Search
CPC .......... G10K 9/13; G10K 9/121; G01V 1/145
USPC .................................. 367/174, 175; 181/120
See application file for complete search history.

(56) References Cited

U.S. PATENT DOCUMENTS

| | | | |
|---|---|---|---|
| 3,258,738 A | 6/1966 | Merchant | |
| 3,886,493 A | 5/1975 | Farr | |
| 3,984,706 A | 10/1976 | Inouye | |
| 4,049,077 A | 9/1977 | Mifsud | |
| 4,159,463 A | 6/1979 | Silverman | |
| 4,384,351 A * | 5/1983 | Pagliarini et al. ............. | 367/175 |
| 4,420,826 A | 12/1983 | Marshall, Jr. et al. | |
| 4,633,970 A | 1/1987 | Mifsud | |
| 4,706,230 A | 11/1987 | Inoue et al. | |

(Continued)

FOREIGN PATENT DOCUMENTS

| | | |
|---|---|---|
| EA | 003029 | 12/2002 |
| EA | 008398 | 4/2007 |

(Continued)

OTHER PUBLICATIONS

U.S. Appl. No. 12/803,505, filed Jun. 29, 2010, Tenghamn.

(Continued)

*Primary Examiner* — Ian J Lobo

(57) ABSTRACT

Disclosed are electromagnetic linear actuators used in acoustic vibratory sources for marine seismic surveying. An embodiment discloses a linear actuator for acoustic sources, comprising: magnetic circuitry comprising a gap; and a coil assembly comprising: a drive coil, wherein at least a first portion of the drive coil is configured to be moved in a linear path in the gap; a pair of ferromagnetic coil guides positioned on either side of the linear path; a first ferromagnetic extension extending laterally from the first portion of the drive coil; and a transmission element coupled to a top side of the first portion of the drive coil. Embodiments also disclose acoustic vibratory sources, marine seismic survey systems, and methods of marine seismic surveying.

29 Claims, 18 Drawing Sheets

(56) References Cited

U.S. PATENT DOCUMENTS

| | | |
|---|---|---|
| 4,715,020 A | 12/1987 | Landrum, Jr. |
| 4,780,856 A | 10/1988 | Becquey |
| 4,823,326 A | 4/1989 | Ward |
| 4,926,392 A | 5/1990 | Handley et al. |
| 4,941,202 A | 7/1990 | Upton |
| 4,969,129 A | 11/1990 | Currie |
| 5,126,979 A | 6/1992 | Rowe, Jr. et al. |
| 5,329,499 A | 7/1994 | Molund et al. |
| 5,375,101 A | 12/1994 | Wolfe et al. |
| 5,424,591 A | 6/1995 | Kuriyama |
| 5,457,752 A | 10/1995 | Engdahl et al. |
| 5,546,361 A | 8/1996 | Boucher et al. |
| 5,757,726 A | 5/1998 | Tenghamn et al. |
| 5,757,728 A | 5/1998 | Tenghamn et al. |
| 5,959,939 A | 9/1999 | Tengham et al. |
| 6,035,257 A | 3/2000 | Epperson |
| 6,041,888 A | 3/2000 | Tenghamn |
| 6,076,629 A | 6/2000 | Tenghamn |
| 6,085,862 A | 7/2000 | Tenghamn |
| 6,488,117 B1 | 12/2002 | Owen |
| 6,545,944 B2 | 4/2003 | de Kok |
| 6,704,245 B2 | 3/2004 | Becquey |
| 6,711,097 B1 | 3/2004 | Engdahl |
| 6,714,867 B2 | 3/2004 | Meunier |
| 6,851,511 B2 | 2/2005 | Tenghamn |
| 7,167,412 B2 | 1/2007 | Tenghamn |
| 7,257,049 B1 | 8/2007 | Laws et al. |
| 7,327,633 B2 | 2/2008 | Bagaini et al. |
| 7,376,045 B2 | 5/2008 | Falkenberg et al. |
| 7,515,505 B2 | 4/2009 | Krohn et al. |
| 7,551,518 B1 | 6/2009 | Tenghamn |
| 7,620,193 B2 | 11/2009 | Metheringham et al. |
| 7,881,158 B2 | 2/2011 | Tenghamn |
| 7,881,160 B2 | 2/2011 | Rouquette |
| 7,974,152 B2 | 7/2011 | Tenghamn |
| 7,987,943 B2 | 8/2011 | Wei et al. |
| 2003/0221901 A1 | 12/2003 | Tenghamn |
| 2009/0010103 A1 | 1/2009 | Sallas et al. |
| 2009/0245019 A1 | 10/2009 | Falkenberg et al. |
| 2009/0321175 A1 | 12/2009 | Tenghamn |
| 2010/0118646 A1 | 5/2010 | Tenghamn |
| 2010/0118647 A1 | 5/2010 | Tenghamn |
| 2010/0254215 A1 | 10/2010 | Cambois |
| 2010/0276224 A1 | 11/2010 | Wei |
| 2010/0302900 A1 | 12/2010 | Tenghamn |
| 2010/0322028 A1 | 12/2010 | Tenghamn |
| 2011/0002484 A1 | 1/2011 | Hama |
| 2011/0038225 A1 | 2/2011 | Tenghamn |
| 2011/0205842 A1 | 8/2011 | Baeten |
| 2012/0037443 A1 | 2/2012 | Eick et al. |

FOREIGN PATENT DOCUMENTS

| | | |
|---|---|---|
| RU | 2045079 C1 | 9/1995 |
| RU | 2126983 C1 | 2/1999 |
| SU | 1056100 A | 11/1983 |
| WO | 0159481 A1 | 8/2001 |
| WO | 2010002431 A1 | 1/2010 |
| WO | 2010037937 A1 | 4/2010 |
| WO | 2011059481 A1 | 5/2011 |

OTHER PUBLICATIONS

Rune Tenghamn, PGS Electrical Marine Vibrator, Tech Link, Nov. 2005, pp. 1-4, vol. 5, No. 11, Publication of PGS Geophysical.

United Kingdom Search Report for Application No. GB1214353.3, dated Dec. 21, 2012.

Data Sheet Terfenol-D.

H. A. J. Rijnja, Low Frequency Projectors for Sound Under Water, Netherlands Organization for Applied Scientific Research, Jan. 1991, Report No. FEL-90-A268, The Hague, The Netherlands.

Feng Xia, Q. M. Zhang, Z. Y. Cheng. A Class IV Flextensional Device Based on Electrostrictive Poly(vinylidene fluoride-trifluoroethylene) Copolymer, Jun. 2003.

Stig Rune Lennart Tenghamn, An Electrical Marine Vibrator with a Flextensional Shell, Exploration Geophysics, Dec. 2006, vol. 3, No. 4, Oxford, England.

* cited by examiner

ELECTROMAGNETIC LINEAR ACTUATORS FOR MARINE ACOUSTIC VIBRATORY SOURCES

CROSS-REFERENCE TO RELATED APPLICATIONS

This application claims the benefit of U.S. Provisional Application No. 61/523,211, entitled "Electromagnetic Linear Actuators for Marine Acoustic Vibratory Sources," filed on Aug. 12, 2011, the entire disclosure of which is incorporated herein by reference.

BACKGROUND

The present invention relates generally to the field of marine seismic surveying. More particularly, in one or more embodiments, this invention relates to electromagnetic linear actuators used in acoustic vibratory sources for marine seismic surveying.

Seismic sources, including vibratory sources, are utilized in geophysical exploration on land and in water covered areas of the Earth. Signals generated by these sources travel downwardly into the Earth and are reflected from reflecting interfaces in the subsurface. Reflected signals are then detected by signal detectors, typically hydrophones or geophones, on or near the Earth's surface.

Most of the seismic sources employed today in marine surveying are of the impulsive type, in which efforts are made to generate as much energy as possible during as short a time span as possible. The frequency content of those sources is controllable only to a small degree, and different sources are selected for the generation of different frequency ranges for different surveying needs. These impulsive sources have a limited acoustic output in the very low frequency band; especially below 5 Hz the output is very poor. Another type of seismic source used in marine surveying includes acoustic vibratory sources, including hydraulically powered sources and sources employing piezoelectric or magnetorestrictive material. While acoustic vibratory sources may have better frequency control than impulsive sources, they are also limited at low frequency content. In general, all sources applied in seismic surveying are typically limited at low frequency content, in that no or very limited energy is generated below 5 Hz.

It is well known that as sound waves travel through water and through subsurface geological structures, higher frequency sounds waves are attenuated more rapidly than lower frequency sound waves, and consequently, lower frequency sound waves can be transmitted over longer distances through water and geological structures than higher frequency sound waves. There has been a long standing need in seismic surveying for powerful, low frequency acoustic vibratory sources operating in the frequency band up to 5 Hz.

Accordingly, there is a continuing need for improved acoustic sources for use in marine surveying.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to the field of marine seismic surveying. More particularly, in one or more embodiments, this invention relates to electromagnetic linear actuators used in acoustic vibratory sources for marine seismic surveying. One of the many potential advantages of the systems and methods of the present invention, only some of which are disclosed herein, is that the electromagnetic linear actuators may have a long mechanical stroke. Accordingly, embodiments of the methods and systems may provide acoustic vibratory sources that can generate high seismic energy amplitudes at low frequency (e.g., between about 0.001 Hz and about 100 Hz, alternatively, between about 0.1 Hz and about 10 Hz, and alternatively between about 0.5 Hz and 5 Hz).

Figure 1:
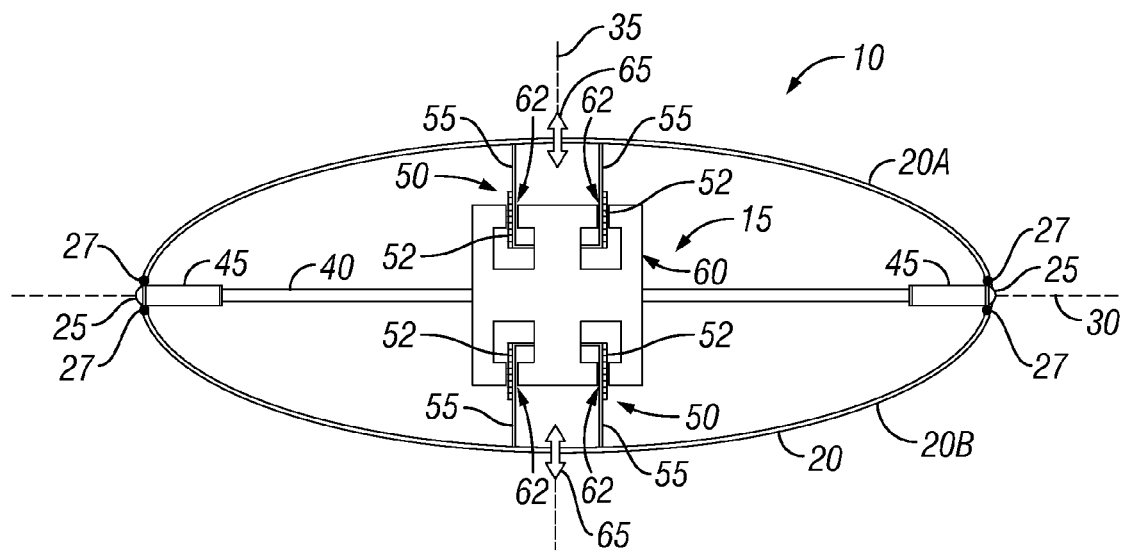
FIG. 1 illustrates a cross-section of a linear actuator and flextensional shell for an acoustic vibratory source in accordance with embodiments of the present invention.

FIG. 1 illustrates an acoustic vibratory source 10 in partial cross-section, in accordance with embodiments of the present invention. As illustrated, the acoustic vibratory source 10 may include a linear actuator 15, which may be an electro-dynamic actuator. In some embodiments (described in more detail below), the linear actuator 15 may be a "moving coil" or "voice coil" actuator, which may provide the ability to generate very large acoustic amplitude. Seismic sources using one or more moving coil actuators may be referred to as "moving coil projectors." Although FIG. 1 illustrates a single, bi-directional linear actuator, embodiments with one or more uni-directional drivers or in which a plurality of actuators are used in parallel are within the scope of the invention.

The illustrated embodiment further includes a flextensional shell 20, which may be made from spring steel or similar resilient metal, and which may be a class V flextensional transducer. Examples of suitable flextensional shells are generally discussed in U.S. Pat. No. 6,076,629 issued to Tenghamn, which is hereby incorporated by reference. As illustrated, the flextensional shell 20 may be formed from two semi-elliptical halves 20A, 20B, joined at or near the ends of their longer, major axes 30 by respective bar structures 25, which may comprise hinges 27 or some other flexible element. In an embodiment, the two semi-elliptical halves 20A, 20B may comprise substantially mirror images of one another. The linear actuator 15 may be connected to the face of the two semi-elliptical halves 20A, 20B of the flextensional shell 20. For example, the linear actuator 15 may be connected at approximately the vertical mid-point of the face of the flextensional shell 20, proximate the ends of the shorter, minor axes 35 of the semi-elliptical halves 20A, 20B. Although FIG. 1 depicts the flextensional shell 20 as being essentially semi-elliptical in shape, flextensional shells of other shapes, including convex, concave, flat, or combinations thereof may also be used in accordance with embodiments of the present invention. In some embodiments, the dimensions, material make-up, and shape of the flextensional shell 20 may be selected to provide a soft spring constant for vibrations of between about 0.001 Hz to about 10 Hz, alternatively, below about 5 Hz, when the acoustic vibratory source 10 is submerged in water.

In some embodiments, the acoustic vibratory source 10 further may include a fixture 40 capable of suspending the linear actuator 15 within the flextensional shell 20. For example, in the illustrated embodiment, the fixture 40 extends along the major axis 30 of the flextensional shell 20 and is coupled to the flextensional shell with linear bearings 45. In some embodiments, the fixture 40 may be mounted to the end bar 25 using the linear bearings 45. As previously mentioned the end bar 25 may comprise hinges 27 or some other flexible element, enabling, for example, contraction of the major axis 30 of the flextensional shell 20 when the minor axis 35 is enlarged by motion of the linear actuator 15.

In some embodiments, the linear actuator 15 comprises coil assemblies 50. As illustrated, the linear actuator 15 may comprise a pair of coil assemblies 50 arranged on opposite sides of the fixture 40 from one another. In the illustrated embodiment, the coil assemblies 50 may each comprise a drive coil 52 and transmission elements 55. As described in more detail below, each of the drive coils 52 may comprise a ferromagnetic extension (e.g., 70 on FIG. 2). As illustrated, the transmission elements 55 may extend between the drive coils 52 and the flextensional shell 50.

In some embodiments, the linear actuator 15 further may comprise magnetic circuitry 60 which is capable of generating a magnetic field. The magnetic circuitry 60 may comprise gaps 62 with at least a portion of the corresponding one of the drive coils 52 oriented inside each of the gaps 62. The drive coils 52 may be configured to move in a linear path in the gaps 62. As illustrated, the magnetic circuitry 60 may be coupled to the fixture 40 while the transmission elements 55 may be coupled to the flextensional shell 20. In some embodiments (not illustrated), this arrangement may be reversed with the magnetic circuitry 60 coupled to the flextensional shell 20, and the transmission elements 55 coupled to the fixture 40. It should be understood that by attaching the heavier part (e.g., the magnetic circuitry 60) to the flextensional shell 20, it may be easier to generate low frequencies without having to make the flextensional shell 20 too weak to allow for a soft spring constant.

Although the following discussion applies only to movement of a single one of the drive coils 52, it should be understood that it also equally applies to the other drive coils 52, as the drive coils 52 may be substantially identical in embodiments of the present invention. As illustrated, the transmission elements 55 may transfer motion of the drive coil 52 to the inner surface of the flextensional shell 20 proximate its minor axis 35. The drive coil 52 may be coupled to a suitable electrical controller (e.g., electrical equipment 240 on FIG. 24) to control the linear actuator 15. For example, the electrical controller (e.g., electrical equipment 240 on FIG. 24) could control current through the drive coil 52, e.g., from direct current to about 100 Hz alternating current, alternatively from direct current to about 10 Hz alternating current, and from direct current to about 5 Hz alternating current. Often, the magnetic circuitry 60 may comprise permanent magnets (e.g., 90 in FIG. 5), though any device capable of generating a magnetic field with a corresponding magnetic flux may be incorporated. When electric current is applied to the drive coil 52, a magnetic field is created by the electric current in the drive coil 52 making it a variable electromagnet. The alternating magnetic field created by the drive coil 52 interacts with the static magnetic field of the magnetic circuitry 60 generating force acting on the drive coil 52 causing it to move back and forth in the direction indicated by arrows 65. The force F acting on the drive coil 52 as a result of electric current I applied to the drive coil 52 may be represented by the following formula:

$$F=IlB, \tag{I}$$

wherein l is the length of the conductor in the drive coil 52 and B is the magnetic flux generated by the magnetic circuitry 60. For constant length l and magnetic flux B, the magnitude of the electric current I thereby determines the magnitude of the force F acting on the drive coil 52. Force F may cause the drive coil 52 to move, and the transmission element 55 may transfer this movement and force F to the flextensional shell 20, which may flex while resisting the movement and force F. Consequently, the magnitude of the electrical current I also determines the length of the stroke of the linear actuator 15. The length of the stroke of the linear actuator 15 should be long, for example, when compared to the height of the drive coil 52. The linear actuator 15 may be configured to provide a stroke length which is long when compared to a height of the coil, which may allow the acoustic vibratory source 10 to generate enhanced amplitude acoustic output in the low frequency ranges, for example between about 0.001 Hz and about 100 Hz, alternatively, between about 0.1 Hz and about 10 Hz, and alternatively between about 0.5 Hz and 5 Hz. In some embodiments, the acoustic vibratory source may generate an acoustic output below about 5 Hz. It should be understood by those of ordinary skill in the art, with the benefit of this disclosure, that the linear actuator 15 can be scaled to be a larger or smaller size, as desired for a particular application. For smaller actuators, a drive coil 52 having a circular cross section may be used, for example. For larger actuators, a drive coil 52 having a rectangular cross section may be used, for example.

To obtain high amplitude acoustic output from the flextensional shell 20 at low frequency ranges, it is desirable for the linear actuator 15 to have long mechanical strokes. In general, the magnetic flux generated in the gaps 62 by the permanent magnets (e.g., 90 in FIG. 5) may have substantial deterioration, for example, when the drive coils 52 approach their outer position. As a result, the force F acting on the drive coils 52 as a result of electric current I applied to the drive coils 52 may be lower than desired. It has recently been discovered that problems associated with this magnetic field deterioration may be reduced by configuring the linear actuator 15 to have moveable flux paths such that the magnetic flux generated by the permanent magnets (e.g., 90 in FIG. 5) across the gaps 62 follows the motion of the drive coils 52. Accordingly, a high constant magnetic field may be obtained in the location where the drive coils 52 are positioned, thus lengthening the mechanical stroke of the linear actuators. For the magnetic field to follow the drive coils 52 so that the drive coils 52 may be guided along their length, the drive coils 52 may have one or more ferromagnetic extensions 70 coupled thereto, as illustrated by FIG. 2.

Figure 2:
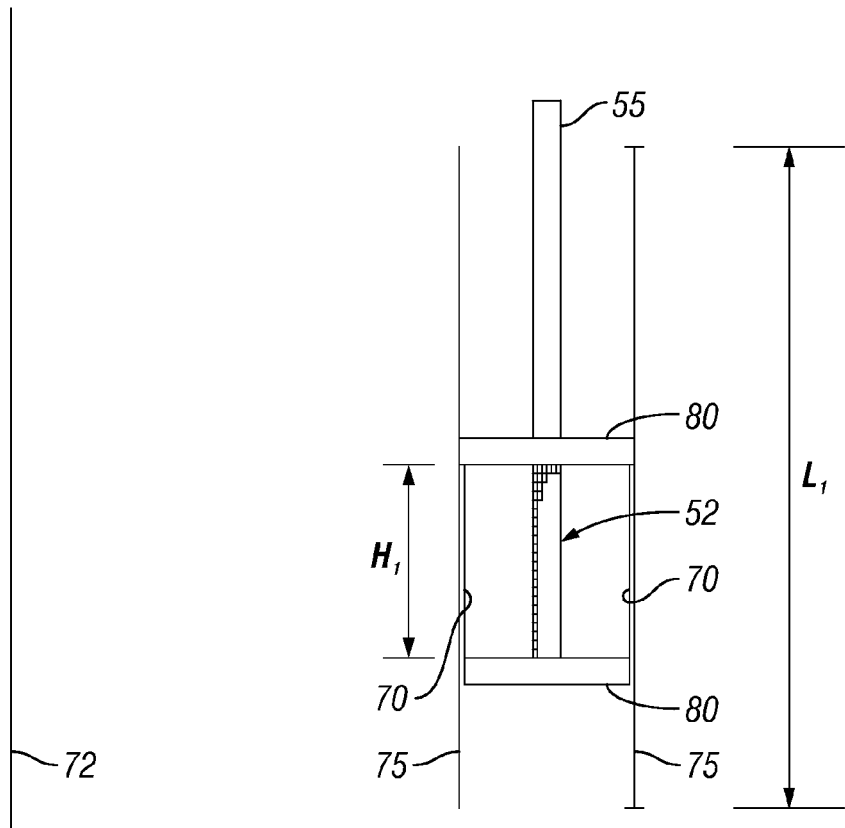
FIG. 2 illustrates a cross-section of a coil assembly for an acoustic vibratory source in accordance with embodiments of the present invention.

FIG. 2 illustrates a cross-section of a coil assembly 50 in accordance with embodiments of the present invention. In the illustrated embodiment, the coil assembly 50 comprises a drive coil 52, ferromagnetic extensions 70 coupled to the drive coil 52, and a transmission element 55. The illustrated embodiment also illustrates a drive coil 52 having a circular cross section with symmetry line 72. It should be noted that a drive coil 52 having a rectangular cross section would have a symmetry plane rather than symmetry line 72.

The drive coil 52 may have a cross-section, for example, that can be circular, elliptical, or quadrilateral (e.g. rectangular), depending for example, space constraints and desired inductance, among others. In one embodiment, the drive coil 52 may be made from a material comprising a ferromagnetic material, such as iron, for example. A drive coil 52 made from a ferromagnetic material may be desired, for example, to increase the flux going through the drive coil 52. In another embodiment, the drive coil 52 may be made from a non-magnetic material, such as copper or aluminum, for example. As illustrated, the transmission element 55 may extend from a top side of the drive coil 52. In some embodiments, the transmission element 55 may comprise, for example, a non-magnetic material that is an electric insulator, such as glass fibers or plastic, for example.

In the illustrated embodiment, the drive coil 52 includes a pair of ferromagnetic extensions 70 extending laterally from opposite sides of the drive coil 52. Any of variety of different techniques may be used to couple the ferromagnetic extensions 70 and the drive coil 52, including, for example, an adhesive, a fastener, or a combination thereof In alternative embodiments (not illustrated), the drive coil 52 may comprise only a single ferromagnetic extension 70, for example, extending from one side of the drive coil 52. The ferromagnetic extensions 70 may each comprise a soft ferromagnetic material, such as soft iron, for example. In some embodiments, the ferromagnetic extensions 70 may substantially cover the volume between the drive coil 52 and the coil guides 75. For example, the clearance between each of the ferromagnetic extensions 70 and the corresponding one of the coil guides 75 may be less than 1 mm and alternatively less than 0.1 mm. It should be understood that ferromagnetic extensions 70 having a clearance outside these values may also be used depending on the particular application. In general, the clearance between each of the ferromagnetic extensions 70 and the corresponding one of the coil guides 75 should be as small as possible to allow the drive coil 52 to move freely between the coil guides 75. The coil guides 75 may extend, for example, parallel to the drive coil 52. The drive coil 52 may be movable along the coil guides 75, for example, in a linear path with the coil guides 75 positioned on either side of the linear path. The drive coil 52 may have a stroke length equal to the length $L_1$ of the coil guides 75 minus the height $H_1$ of the drive coil 52. In the illustrated embodiment, the stroke length is long when compared to the height $H_1$ of the drive coil 52. By way of example, the drive coil 52 may have a stroke length that is greater than the height $H_1$ of the drive coil 52, alternatively, at least 2 times the height, alternatively, at least 3 times the height $H_1$, and, alternatively, at least 4 times the height $H_1$. The coil assembly 50 further may comprise coil end caps 80 that bound the drive coil 52 on its top and bottom. The coil end caps 80 may be made from a non-magnetic material that is an electric insulator, such as glass fibers or plastic, for example.

Figure 3:
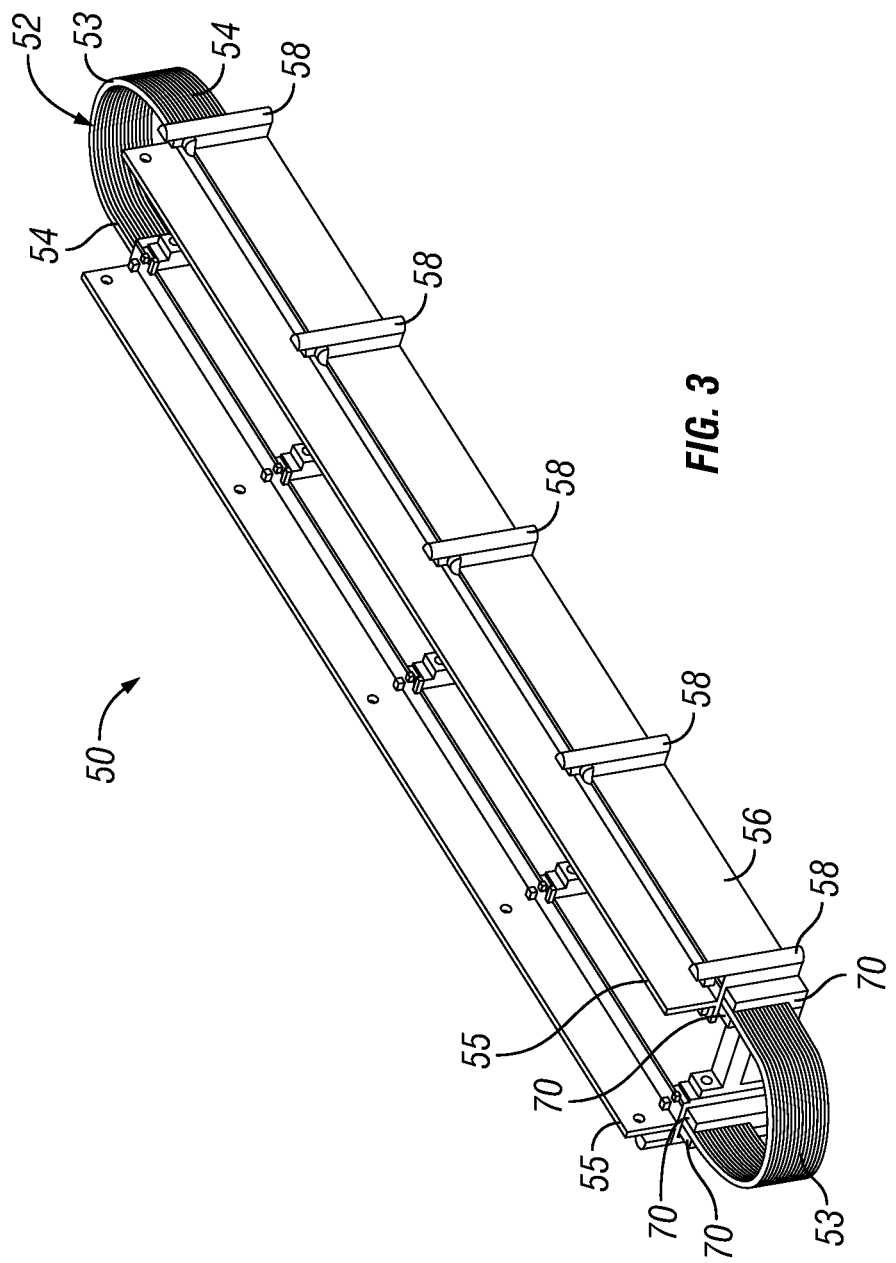
FIG. 3 illustrates a coil assembly for an acoustic vibratory source in accordance with embodiments of the present invention.

Details of a particular implementation of a coil assembly 50 will be described now with reference to FIG. 3 in accordance with embodiments of the present invention. As illustrated, the coil assembly 50 may comprise drive coil 52, ferromagnetic extensions 70 coupled to the drive coil 52, and transmission elements 55. In the illustrated embodiment, the drive coil 52 is a closed loop structure having curved ends 53 coupled by long portions 54. At least a portion of the drive coil 52 may be arranged in one or more of the gaps 62 (e.g., shown on FIG. 1) of the magnetic circuitry 60. In one embodiment, at least a portion of each of the long portions 54 of the drive coil 52 may be arranged in a corresponding one of the gaps 62. As illustrated, the coil assembly 50 further may comprise a coil fixture 56. In the illustrated embodiment, the coil fixture 56 extends generally parallel to the long portions 54 of the drive coil 52 and is coupled to the drive coil 52. In some embodiments, the transmission elements 55 may be mounted to the drive coil 52 with the coil fixture 56. As illustrated, the coil assembly 50 further may comprise linear bearings 58 coupled to the coil fixture 56. The linear bearings 58 may, for example, constrain motion of the coil assembly 50 with respect to the magnetic circuitry 60 (e.g., shown on FIG. 1).

Figure 4:
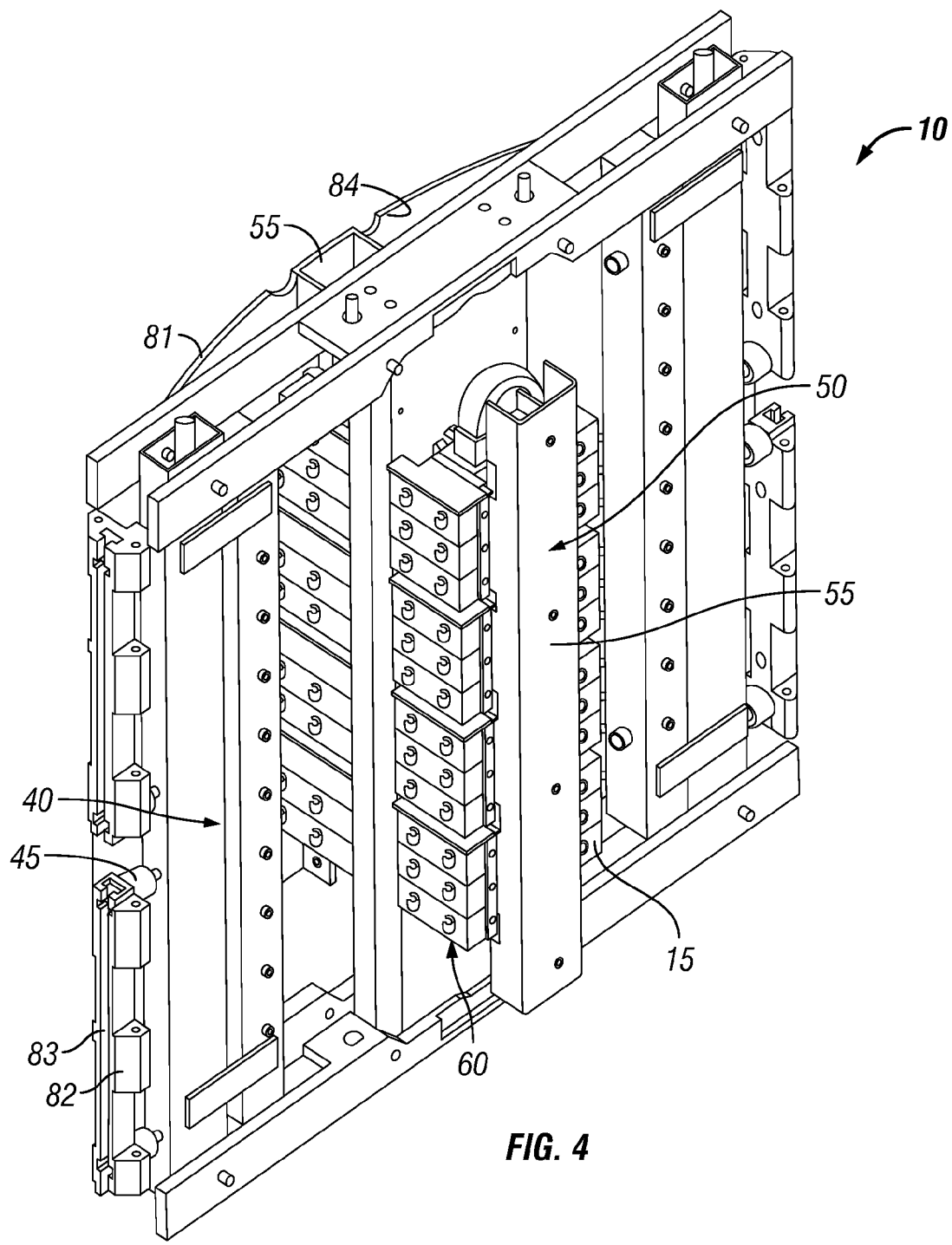
FIG. 4 illustrates a coil assembly in a magnetic circuit and fixture in accordance with embodiments of the present invention.

Details of a particular implementation of an acoustic vibratory source 10 will be described now with reference to FIG. 4 in accordance with embodiments of the present invention. As illustrated, the acoustic vibratory source 10 may comprise the linear actuator 15. The magnetic circuitry 60 and one of the pair of opposing coil assemblies 50 of the linear actuator 15 are also generally shown in the illustrated embodiment. The second one of the pair of opposing coil assemblies 50 is obstructed in the illustrated embodiment with only the top of transmission element 55 shown. The illustrated embodiment further includes a first inner spring element 81, which may be made from spring steel or similar resilient metal, for example. Opposite ends of the spring element 81 may be coupled to inner hinges 82 located on inner end bar 83, enabling, for example, contraction of the first inner spring 81 caused by motion of the linear actuator 15. As illustrated, the linear actuator 15 may be connected to an inner face 84 of the first inner spring element 81, for example, via transmission element 55. The inner end bar 83 may be mounted to fixture 40 via linear bearings 45. As previously mentioned, the fixture 40 may be provided for suspending the linear actuator 15 within the flextensional shell 20 (e.g., shown on FIG. 1). When fully assembled, a second inner spring element (not illustrated), which may comprise a substantially mirror image of the first inner spring element 81, can be hingedly coupled by the inner hinges 82 to complete an inner shell surrounding the linear actuator 15. While not illustrated on FIG. 4, a flextensional shell 20 (e.g., shown on FIG. 1) would generally surround the inner shell formed by the first inner spring element 81 and second inner spring element. Although FIG. 4 depicts the first inner spring element 81 as being essentially flat in shape, spring elements of other shapes, including convex, concave, semi-elliptical, or combinations thereof may also be used in accordance with embodiments of the present invention. In some embodiments, the dimensions, material make-up, and shape of the first inner spring element 81 may be selected to provide a soft spring constant for vibrations of between about 0.001 Hz to about 10 Hz, alternatively, below about 5 Hz, when the acoustic vibratory source 10 is submerged in water. In general, the first inner spring element 81 could be configured, for example, to provide an additional resonance frequency, in addition to that generated by flextensional shell 20 (e.g., shown on FIG. 1).

Figure 5:
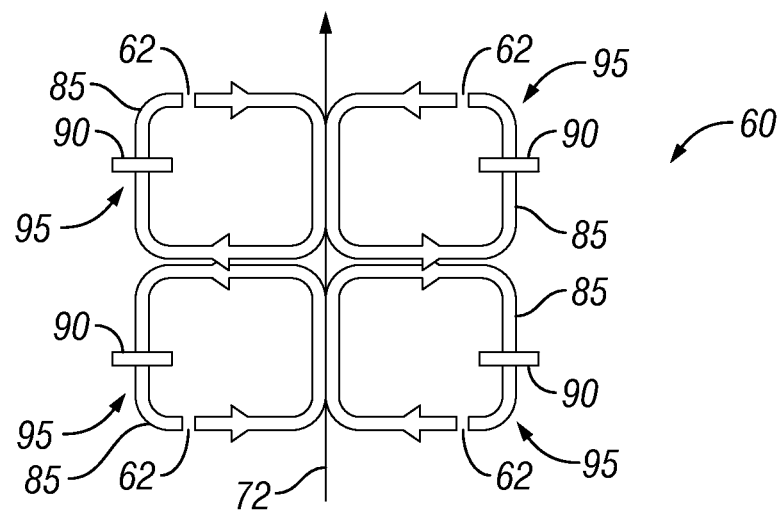
FIGS. 5 and 6 illustrate schematic diagrams of alternative arrangements of a magnetic circuit for an acoustic vibratory source in accordance with embodiments of the present invention.
Figure 6:
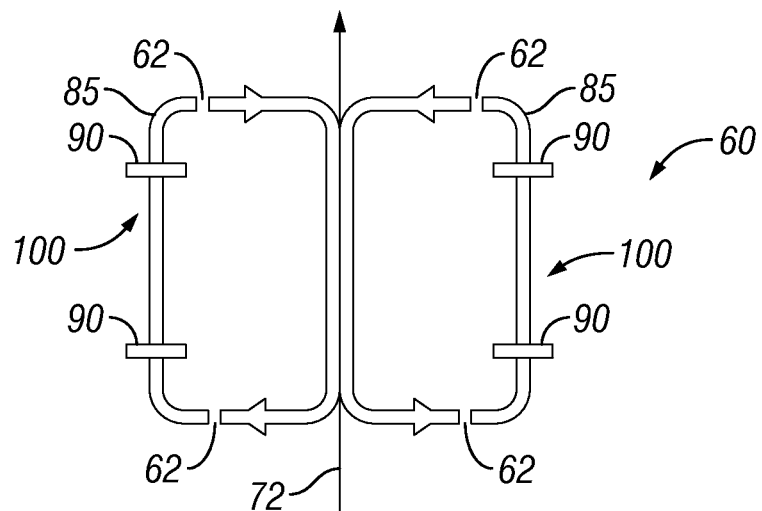

As previously mentioned, embodiments may include arranging the coil assemblies 50 of the linear actuator 15 in magnetic circuitry 60 for generating a magnetic field. FIGS. 5 and 6 illustrate schematic diagrams of alternative arrangements of magnetic circuitry 60 showing the magnetic flux paths 85, permanent magnets 90, and gaps 62 of the magnetic circuitry 60 in accordance with embodiments of the present invention. The illustrated embodiments also show the symmetry line 72. As previously mentioned, the symmetry line 72 generally indicates that the drive coil 52 (e.g., shown on FIG. 1) has a circular cross section. It should be noted that a drive coil 52 having a rectangular cross section would have a symmetry plane rather than symmetry line 72. As illustrated by FIG. 5, the magnetic circuitry 60 may comprise parallel magnetic circuits 95 with the parallel magnetic circuits 95 comprising permanent magnets 90 for generating magnetic fields with corresponding flux paths 85. Gaps 62 may be formed in the magnetic circuits 95. As illustrated by FIG. 6, the magnetic circuitry 60 may comprise series connected magnetic circuits 100 with the series connected magnetic circuits 100 comprising permanent magnets 90 for generating magnetic fields with corresponding flux paths 85. Gaps 62 may be formed in the magnetic circuits 95.

Figure 7:
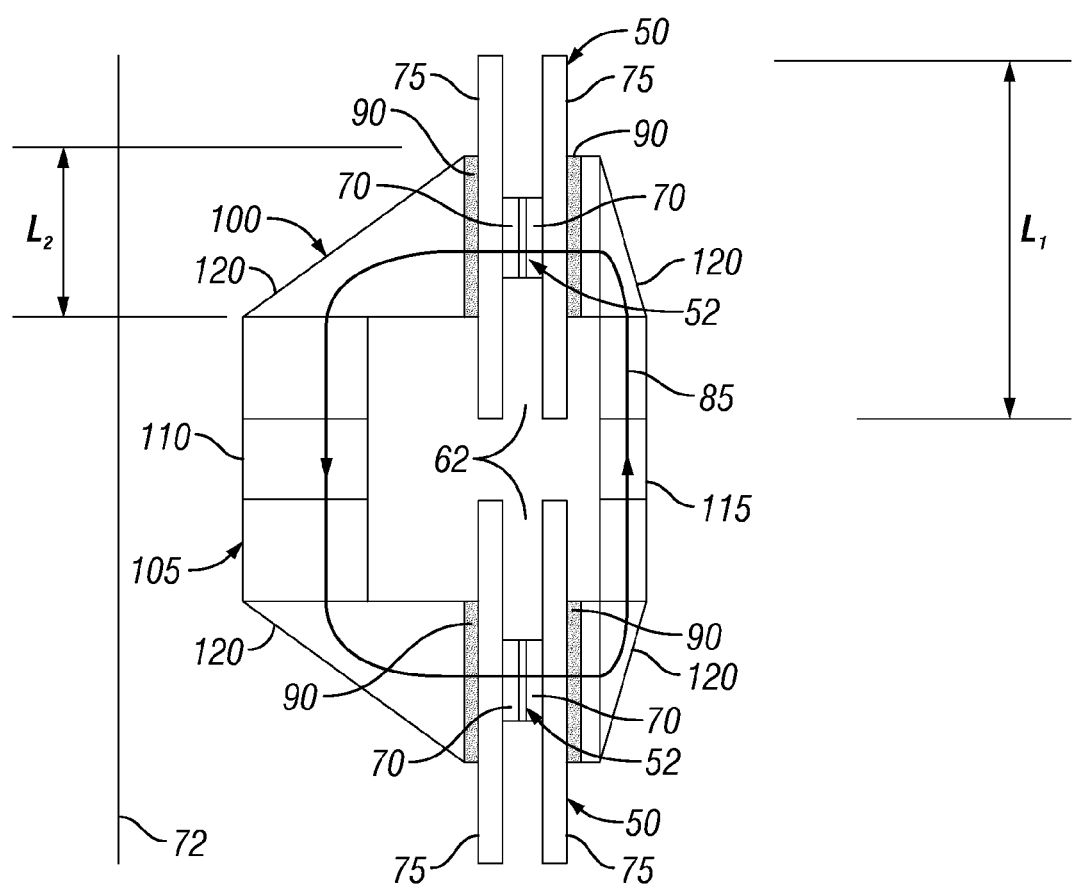
FIGS. 7-10 illustrate schematic diagrams of alternative arrangements of a linear actuator with magnetic circuitry for an acoustic vibratory source in accordance with embodiments of the present invention.

FIGS. 7-10 illustrate alternative arrangements of coil assemblies 50 disposed in series connected magnetic circuits 95 in accordance with embodiments of the present invention. Referring now to FIG. 7, one example for arranging coil assemblies 50 in series connected magnetic circuits 100 will be desired in more detail.

As illustrated, the series connected magnetic circuits 100 comprise a common yoke 105 having an inner yoke portion 110 and an outer yoke portion 115. In some embodiments, the inner yoke portion 110 and the outer yoke portion 115 may each comprise a ferromagnetic material, such as iron. In one embodiment, the inner yoke portion 110 and the outer yoke portion 115 may each comprise a soft ferromagnetic material, such as soft iron. As illustrated, the upper and lower portions of the inner yoke portion 110 and the outer yoke portion 115 may have tapered portions 120, for example, to minimize the amount of ferromagnetic material that may be required.

As illustrated, the series connected magnetic circuits 100 may also comprise permanent magnets 90. For example, a pair of permanent magnets 90 may be coupled to the inner sides of the upper portions of the inner yoke portion 110 and the outer yoke portion 115, respectively. By way of further example, another pair of permanent magnets 90 may be coupled to the inner sides of the lower portions of the inner yoke portion 110 and the outer yoke portion 115, respectively. In one embodiment, the permanent magnets 90 may be coupled to the inner sides of the inner yoke portion 110 and the outer yoke portion 115 with, for example, an adhesive, a fastener, or a combination thereof. As illustrated, the gaps 62 may be provided between the permanent magnets 90. In the illustrated embodiment, the coil guides 75 of each of the coil assemblies 50 may be coupled to the inner sides of the permanent magnets 90, for example, with an adhesive. In the illustrated embodiment, the coil guides 75 have a length $L_1$ that is longer than the length $L_2$ of the permanent magnets 90. For example, the coil guides 75 may be from 25% to about 150% longer than the permanent magnets 90 and alternatively about 50% to about 125% longer. As illustrated, the drive coils 52 having ferromagnetic extensions 70 may be oriented in the gaps 62 between the permanent magnets 90.

Figure 8:
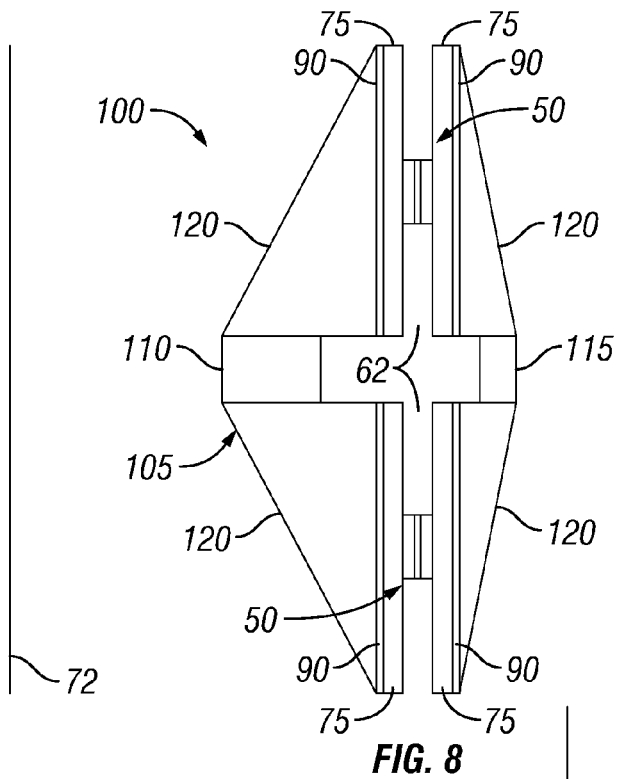

In some embodiments, flux leakage may occur across the coil guides 75. This flux leakage may be due, for example, to the difference in length between the coil guides 75 and the permanent magnets 90. To decrease this flux leakage, the length of the coil guides 75 may be reduced and/or the length of the permanent magnets 90 may increased. In addition, it may be desirable to obtain a more even distribution of the magnemotive forces ("MMF") of the permanent magnets 90. FIG. 8 illustrates another example for arranging coil assemblies 50 in series connected magnetic circuits 100. In the illustrated embodiment, the configuration of the common yoke 105 has been optimized, for example, to decrease flux leakage, obtain a more even distribution of MMF of the permanent magnets 90 and/or decrease flux leakage. As illustrated, embodiments may include a reduction in the thickness of the permanent magnets 90. For example, the thickness of the permanent magnets 90 may be approximately halved as compared to the embodiment illustrated by FIG. 7. Further, the difference in length between the coil guides 75 and the permanent magnets 90 has been reduced in the illustrated embodiments. For example, the coil guides 75 and the permanent magnets 90 may have lengths that are within about 10%, alternatively without about 5%, alternatively within about 1% of one another, and alternatively of equal length. This difference in lengths may be adjusted, for example, by lengthening of the permanent magnets 90 and/or shortening of the coil guides 75. Moreover, the lengths of the tapered portions 120 of the inner yoke portion 110 and the outer yoke portion 115 have been extended in the illustrated embodiment.

Figure 9:
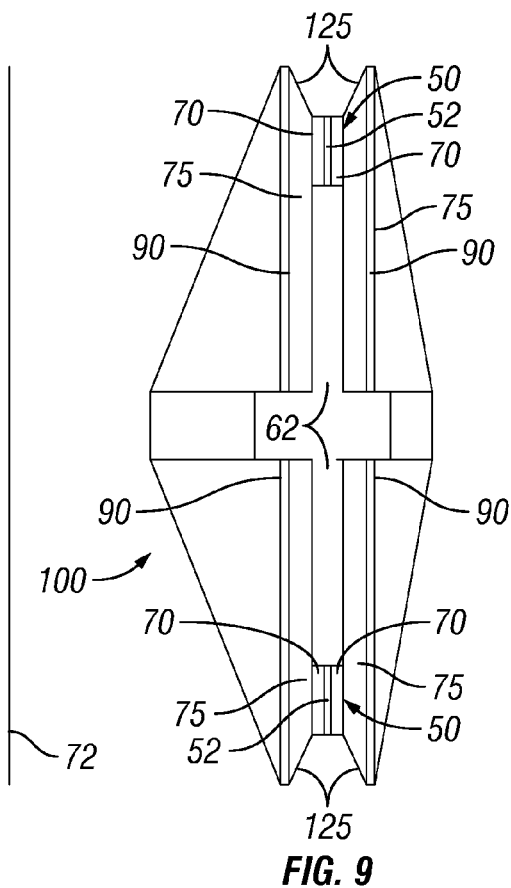

In some embodiments, the magnetic field generated by permanent magnets 90 may have substantial deterioration, for example, when the drive coils 52 approaches its outer position. As a result, the force F acting on the drive coils 52 as a result of electric current I applied to the drive coils 52 may be lower than desired. FIG. 9 illustrates another example for arranging coil assemblies 50 in series connected magnetic circuits 100. In the illustrated embodiment, the drive coils 52 having ferromagnetic extensions 70 are shown in their outer position. To reduce magnetic field deterioration, the coil assembly 50 may be configured such that the coil guides 75 extend beyond the outer position of the drive coil 52. For example, the coil guides 75 may extend more than about 1 cm and alternatively more than about 5 cm beyond the outer position of the drive coil 52. In the illustrated embodiment, the coil guides 75 include tapered ends 125 that restrict or limit movement of the drive coil 52 to the end of the coil guides 75.

Figure 10:
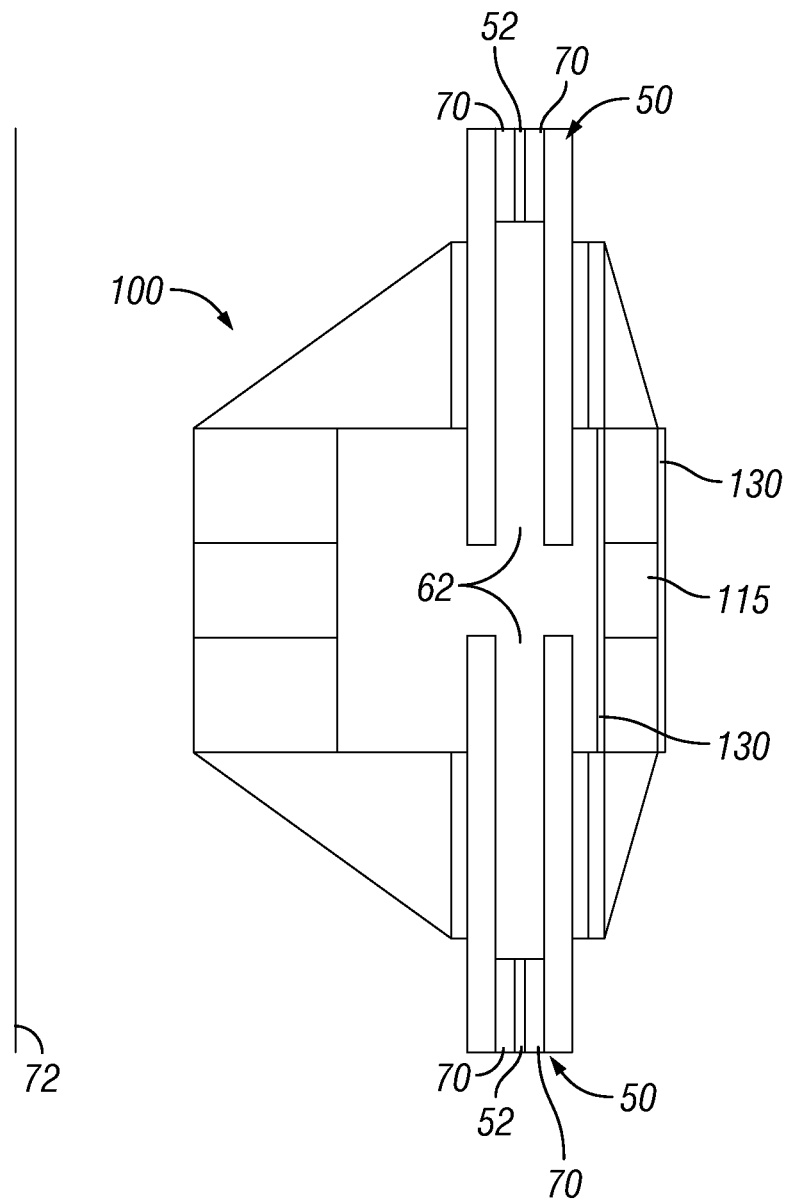

FIG. 10 illustrates yet another example for arranging coil assemblies 50 in series connected magnetic circuits 100. As illustrated, the coil assemblies 50 includes drive coils 52 having ferromagnetic extensions 70 with the drive coils 52 oriented in the gaps 62 in the series connected magnetic circuits 100. However, rather than using permanent magnets 90 (e.g., shown on FIGS. 7-9) for generation of the magnetic field, the series connected magnetic circuits 100 comprise direct current coils 130. In the illustrated embodiment, the direct current coils 130 are coupled to the outer yoke portion 115.

Figure 11:
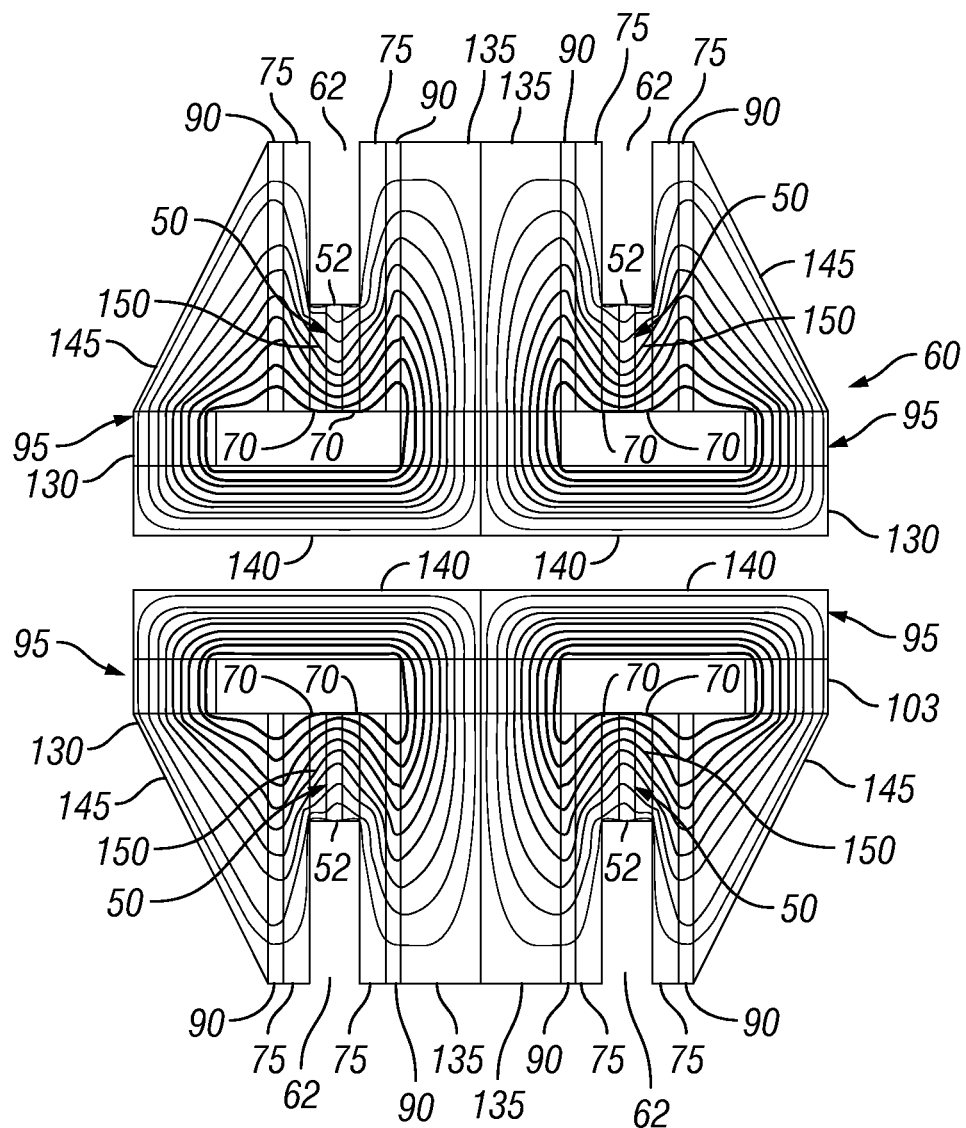
FIGS. 11-13 illustrate schematic diagrams of a linear actuator in different positions showing the movable flux path in accordance with embodiments of the present invention.
Figure 12:
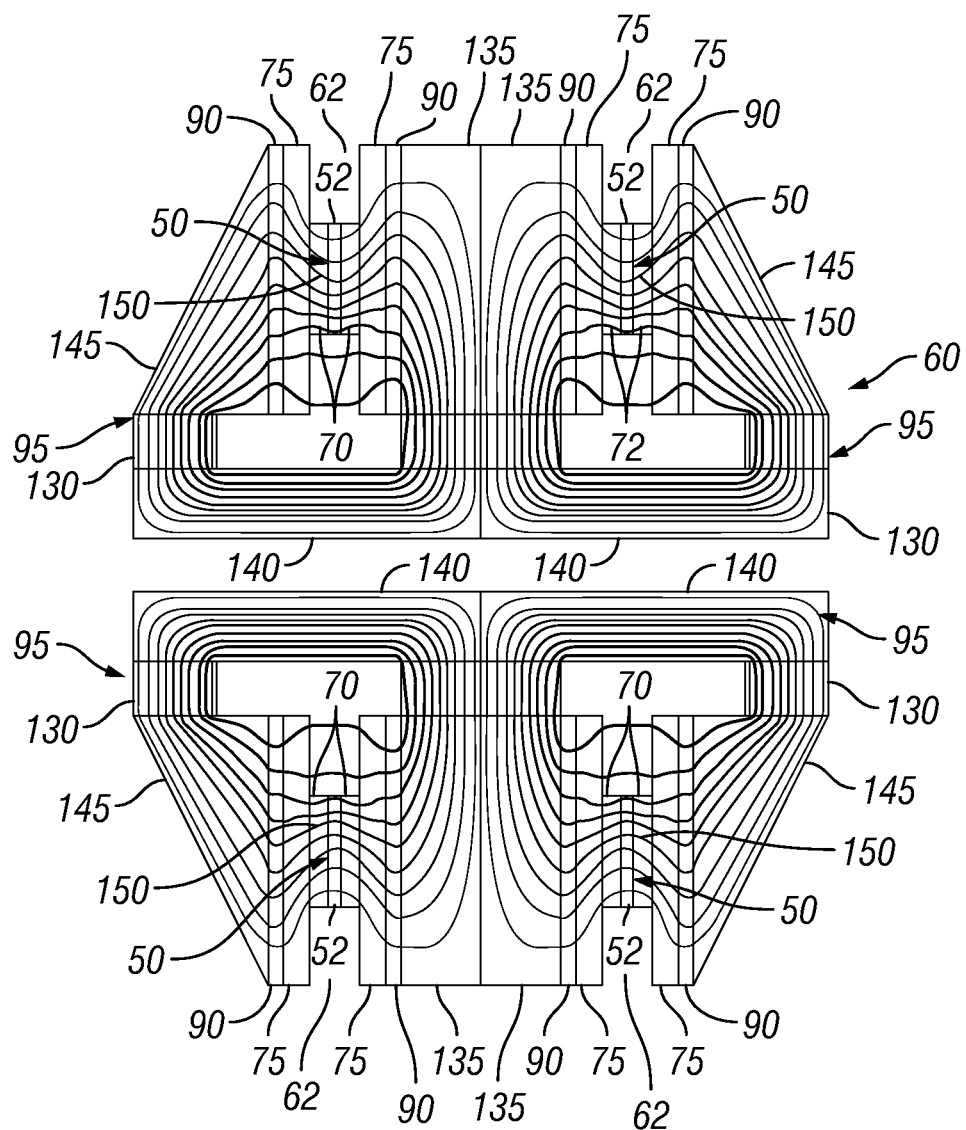
Figure 13:
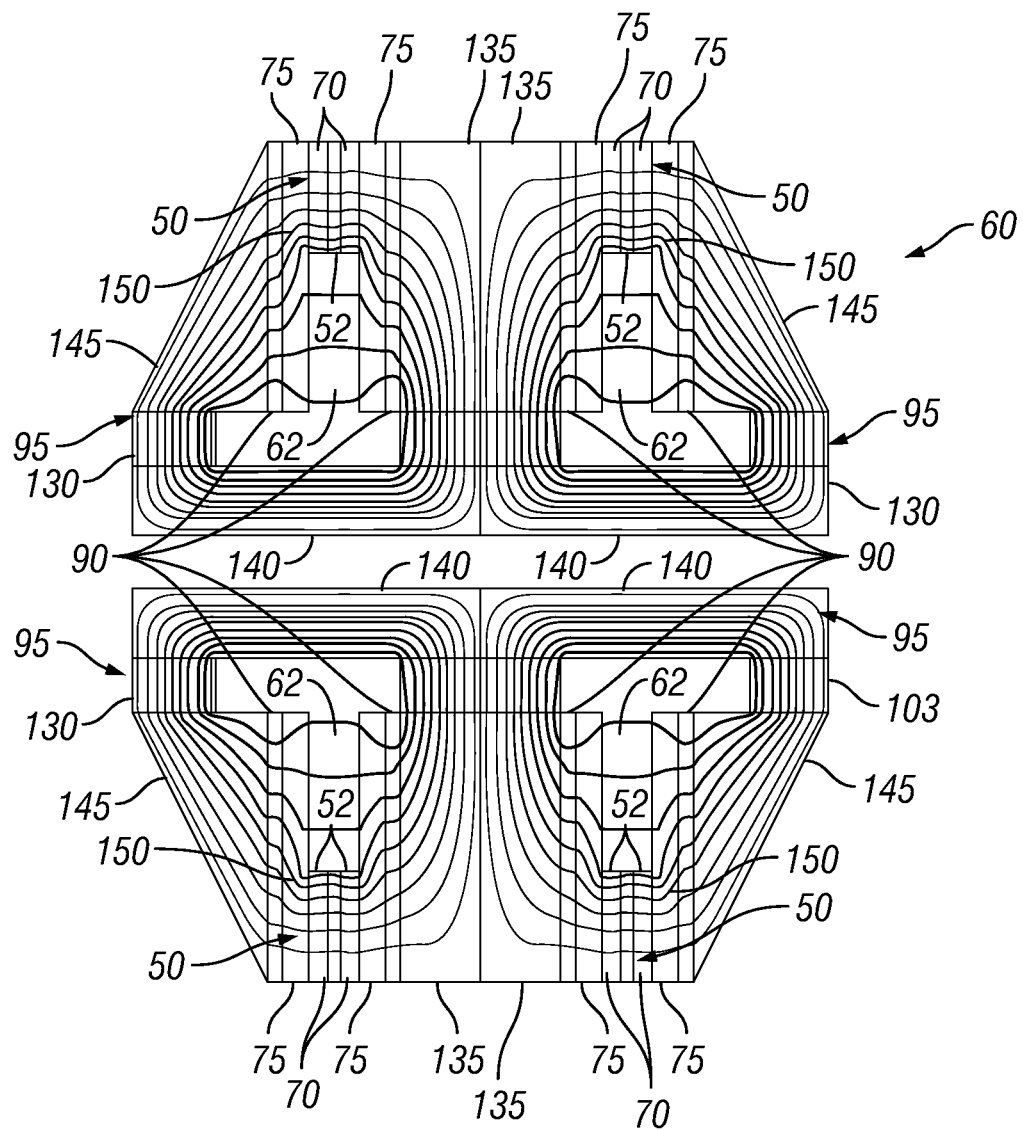

FIGS. 11-13 illustrate one example for arranging coil assemblies 52 in a magnetic circuit 60 that comprises parallel magnetic circuits 95. In the illustrated embodiment, the magnetic circuit 60 comprises four parallel magnetic circuits 95 with each of the parallel magnetic circuits 95 having one of the coil assemblies 50 arranged therein. As illustrated, each of the parallel magnetic circuits 95 may comprise a yoke 130 with the yoke 130 comprising an inner yoke portion 135, a base yoke portion 140, and an outer yoke portion 145. In one embodiment, each of the inner yoke portion 135, base yoke portion 140, and outer yoke portion 145 are separate plates that have been coupled to one another. In some embodiments, the outer yoke portion 145 for each of the parallel magnetic circuits 95 may be tapered, for example, to reduce the amount of ferromagnetic material.

As illustrated, the parallel magnetic circuits 95 may also comprise permanent magnets 90. For example, a pair of permanent magnets 90 may be coupled to the inner sides of the inner yoke portion 135 and outer yoke portion 145, respectively, for each of the parallel magnetic circuits 95. In one embodiment, the permanent magnets 90 may be coupled to the inner sides of the inner yoke portion 135 and outer yoke portion 145 with an adhesive, for example. The permanent magnets 90 should generate a constant magnetic field 150. As illustrated, the gaps 62 are provided between the permanent magnets 90. In the illustrated embodiment, the coil guides 75 of each of the coil assemblies 50 may be coupled to the inner sides of the permanent magnets 90, for example, with an adhesive. As illustrated, the drive coils 52 having ferromagnetic extensions 70 may be oriented in the gaps 62 between the permanent magnets 90.

As previously mentioned, the ferromagnetic extensions 70 coupled to the drive coils 52 should cause the magnetic field to follow the drive coils 52 as they move through the gaps 62. Referring now to FIG. 11, the drive coils 52 are shown in their lower position with the corresponding magnetic fields 150 generated by the permanent magnets 90 substantially following the drive coils 52. As can be seen by FIG. 12, the magnetic fields 150 substantially follow the drive coils 52 as they move to their central position. Further, the magnetic fields 150 continue to substantially follow the drive coils 52 as they move to their upper position, as illustrated by FIG. 13. Accordingly, a high constant magnetic field may be obtained in the location where the drive coils 52 are positioned, thus lengthening the mechanical stroke of the linear actuator 15 (e.g., shown on FIG. 1).

Figure 14:
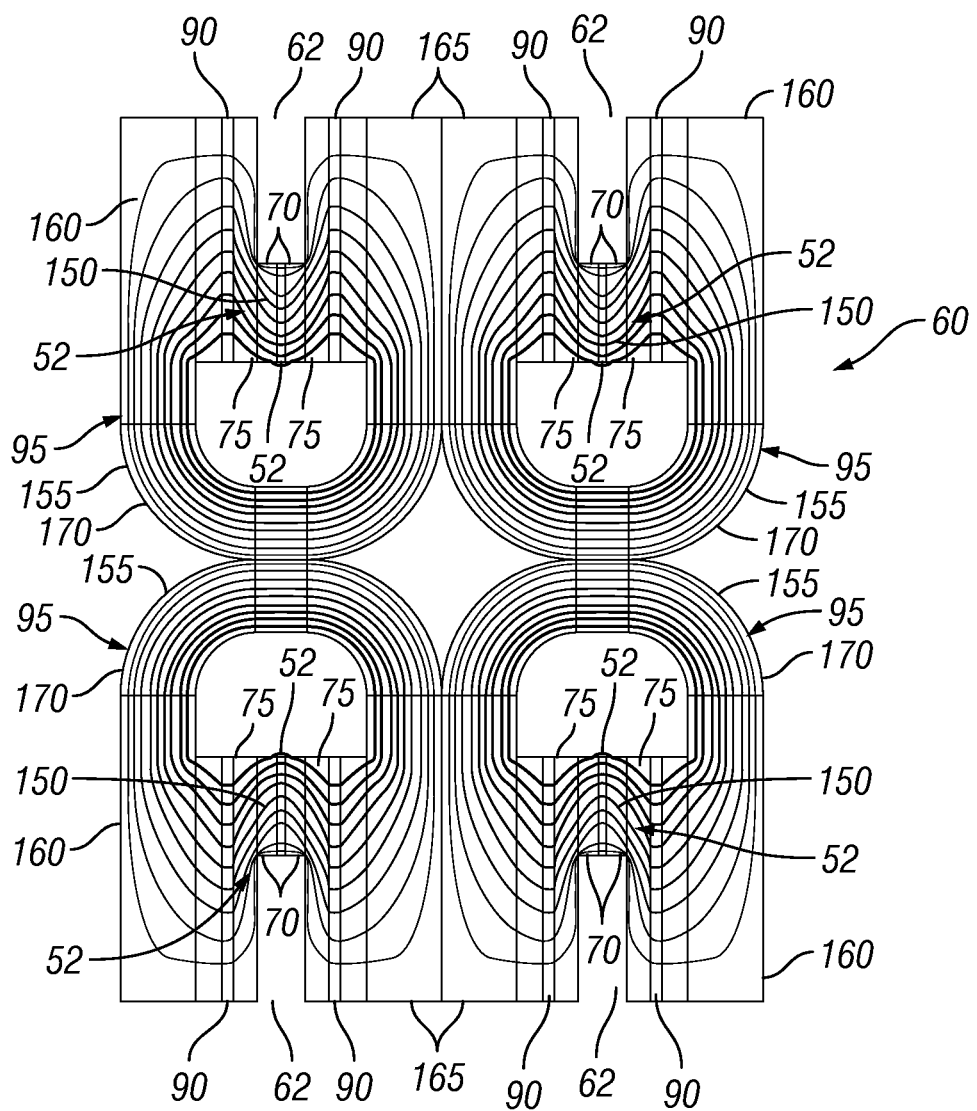
FIG. 14 illustrates a schematic diagram of an alternative arrangement of a linear actuator with magnetic circuitry for an acoustic vibratory source in accordance with embodiments of the present invention.

FIG. 14 illustrates another example for arranging coil assemblies 52 in a magnetic circuit 60 that comprises parallel magnetic circuits 95. In the illustrated embodiment, the magnetic circuit 60 comprises four parallel magnetic circuits 95 with each of the parallel magnetic circuits 95 having one of the coil assemblies 50 arranged therein. As illustrated, each of the parallel magnetic circuits 95 comprises a generally U-shaped yoke 155. In one embodiment, the U-shaped yoke 155 may be a laminated yoke. As illustrated, the U-shaped yoke 155 may comprise an outer arm portion 160, inner arm portion 165, and a rounded base portion 170 interconnecting the outer and inner arm portions 160, 165.

As illustrated, the parallel magnetic circuits 95 may also comprise permanent magnets 90. For example, a pair of permanent magnets 90 may be coupled to the inner sides of the outer arm portion 160 and the inner arm portion 165, respectively, for each of the parallel magnetic circuits 95. In one embodiment, the permanent magnets 90 may be coupled to the inner sides of the outer arm portion 160 and the inner arm portion 165 with an adhesive, for example. The permanent magnets 90 should generate a constant magnetic field 150. As illustrated, the gaps 62 may be provided between the permanent magnets 90. In the illustrated embodiment, the coil guides 75 of each of the coil assemblies 50 may be coupled to the inner sides of the permanent magnets 90, for example, with an adhesive. As illustrated, the drive coils 52 having ferromagnetic extensions 70 may be oriented in the gaps 62 between the permanent magnets 90. The illustrated embodiments, shows the drive coils 52 in their lower position with the magnetic field 150 generated by the permanent magnets 90 substantially following the drive coils 52 in this position.

Figure 15:
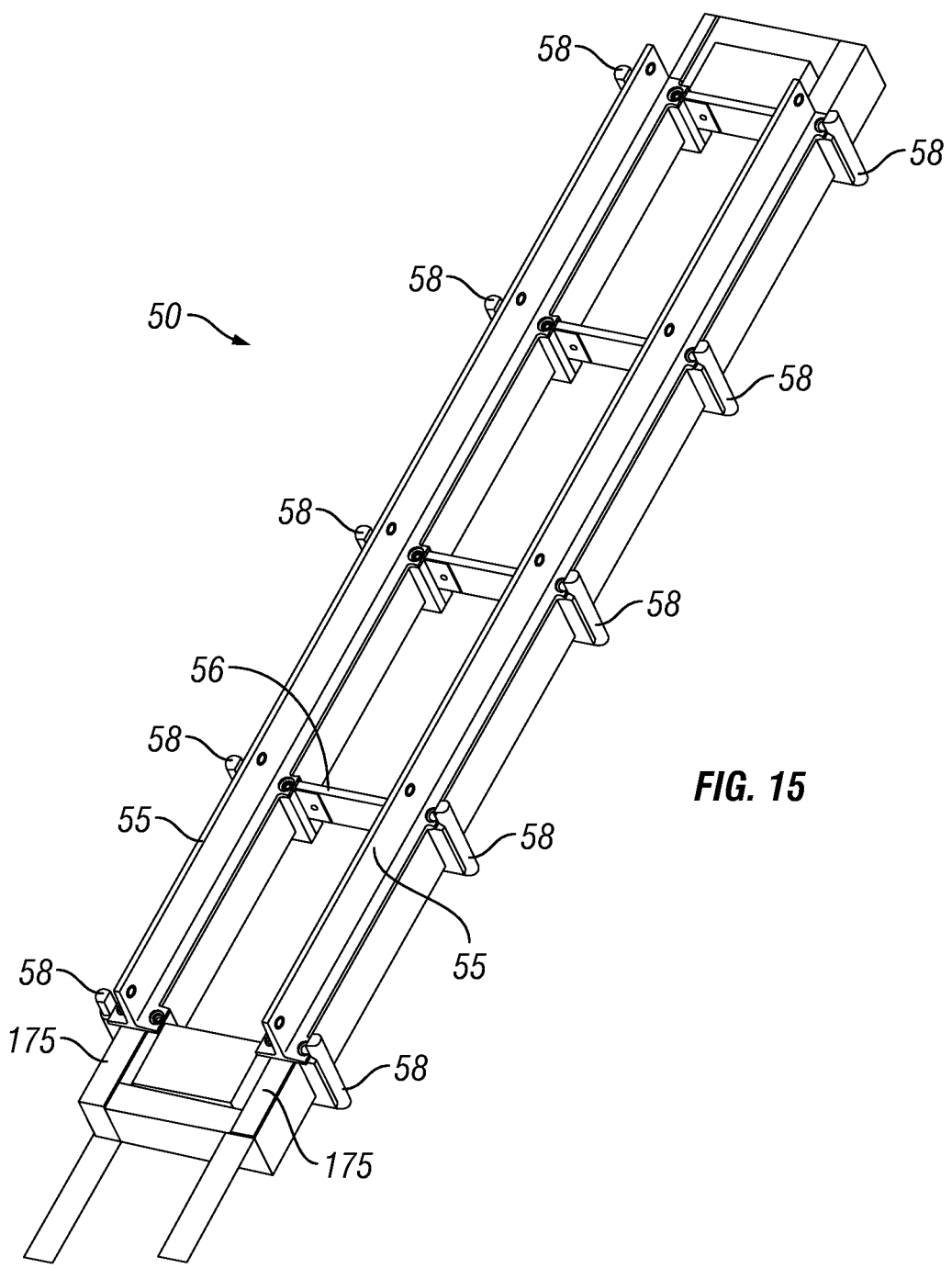
FIG. 15 illustrates an alternative coil assembly for an acoustic vibratory source in accordance with embodiments of the present invention.
Figure 16:
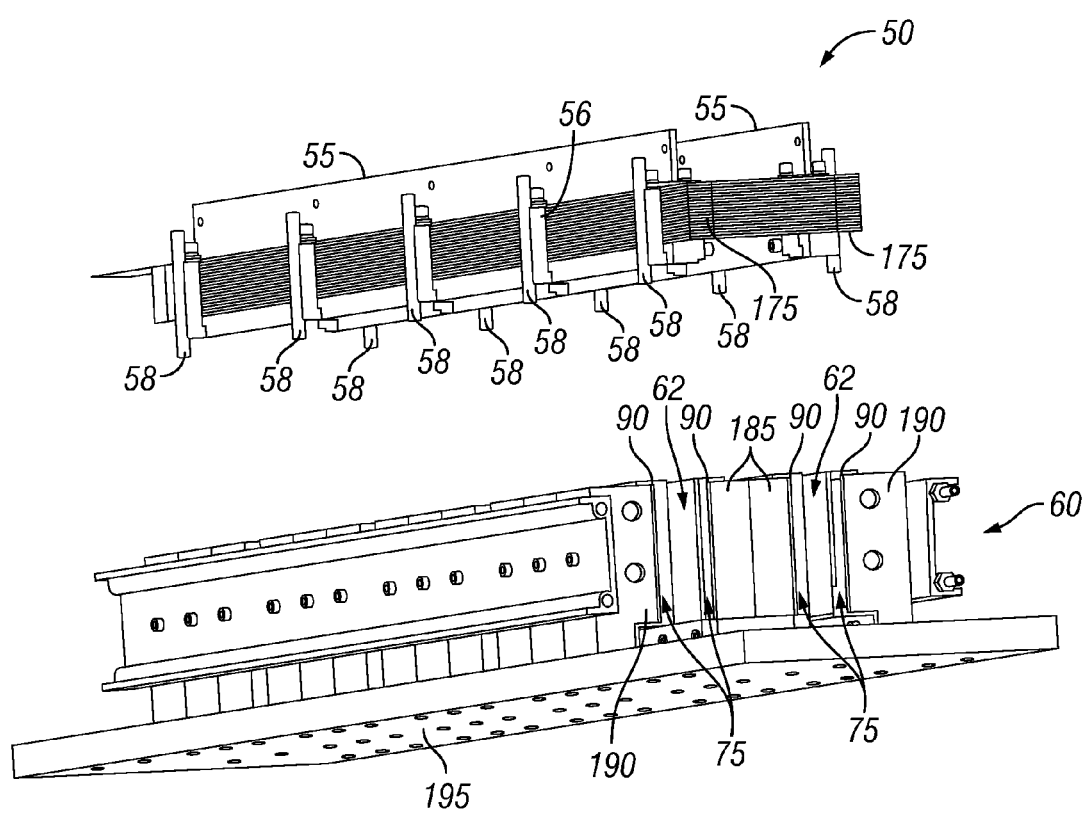
FIG. 16 illustrates the coil assembly of FIG. 15 with a magnetic circuit in accordance with embodiments of the present invention.

While the previously described embodiments describe drive coils 52 having ferromagnetic extensions 70 coupled to the drive coils 52, it should be understood that the present invention also encompasses embodiments in which ferromagnetic coils 175 have integrally formed extensions such that the ferromagnetic coils 175 at least substantially bridges the gaps 62 in the magnetic circuitry 60. Details of a particular implementation of a coil assembly 50 comprising a ferromagnetic coil 175 with integrally formed extensions will be described in more detail with respect to FIGS. 15-23. FIG. 15 illustrates a coil assembly 50 comprising a ferromagnetic coil 175. FIGS. 16-23 further illustrate magnetic circuitry 60 into which the ferromagnetic coil 175 may be oriented in accordance with embodiments of the present invention. The coil assembly 50 may comprise ferromagnetic coil 175 and transmission elements 55. The ferromagnetic coil 175 may be made from a material comprising a ferromagnetic material, such as iron, for example. In some embodiments, the ferromagnetic material may be a soft ferromagnetic material. As best seen in FIG. 15, the coil assembly 50 further may comprise a coil fixture 56. In the illustrated, embodiment, the coil fixture 56 is coupled to the ferromagnetic coil 175. In some embodiments, the transmission elements 55 may be mounted to the ferromagnetic coil 175 with the coil fixture 56, as best seen in FIG. 15. As illustrated, the coil assembly 50 further may comprise linear bearings 58 coupled to the coil fixture 56. The linear bearings 58 may, for example, constrain motion of the coil assembly 50 with respect to the magnetic circuitry 60.

In some embodiments, the magnetic circuitry 60 may comprise inner yoke plates 185, outer yoke plates 190, and base yoke plate 195, as best seen on FIGS. 16-23. As illustrated, permanent magnets 90 may be coupled to the inner sides of the inner yoke plates 185 and the outer yoke plates 190, respectively. Gaps 62 are defined between the permanent magnets 90. In the illustrated embodiment, coil guides 75 for the coil assembly 50 may be coupled to the inner sides of the permanent magnets 90. As illustrated, the ferromagnetic coil 175 may comprise two long portions with each of the long portions oriented in a corresponding one of the gaps 62 between the permanent magnets 90.

Figure 17:
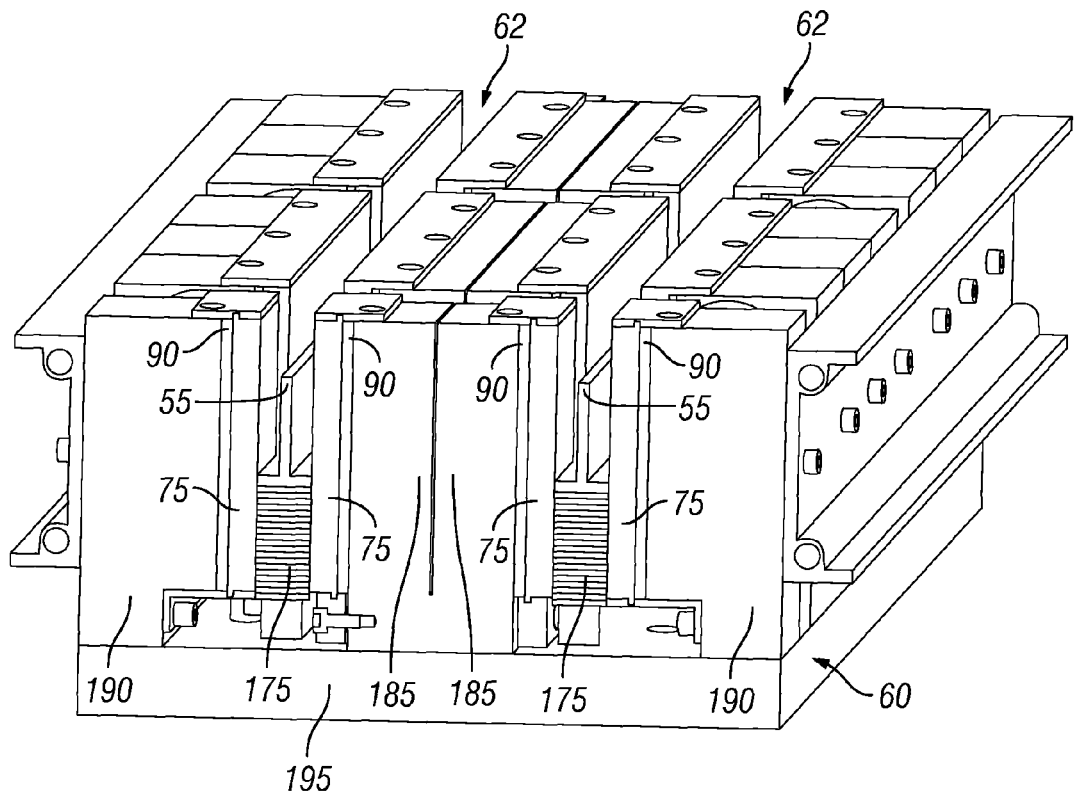
FIGS. 17 and 18 illustrate the coil assembly of FIG. 15 in a lower position in the magnetic circuit in accordance with embodiments of the present invention.
Figure 18:
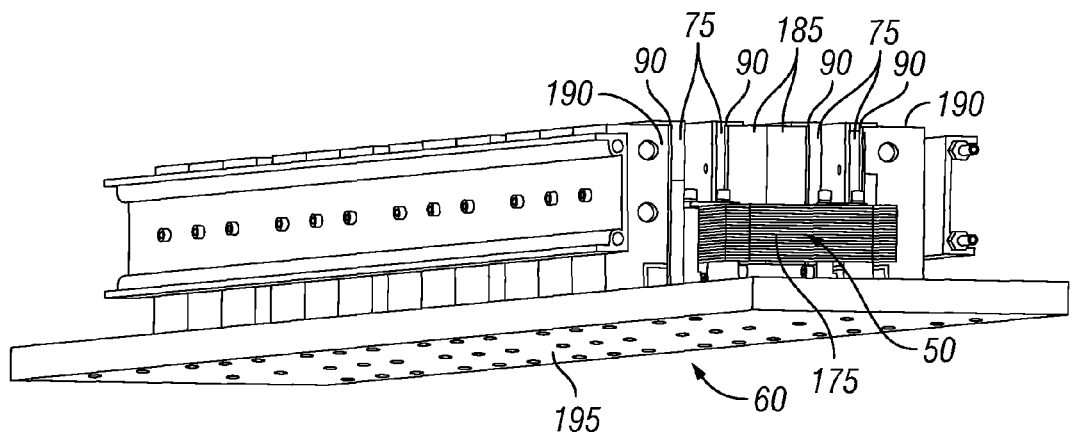
Figure 19:
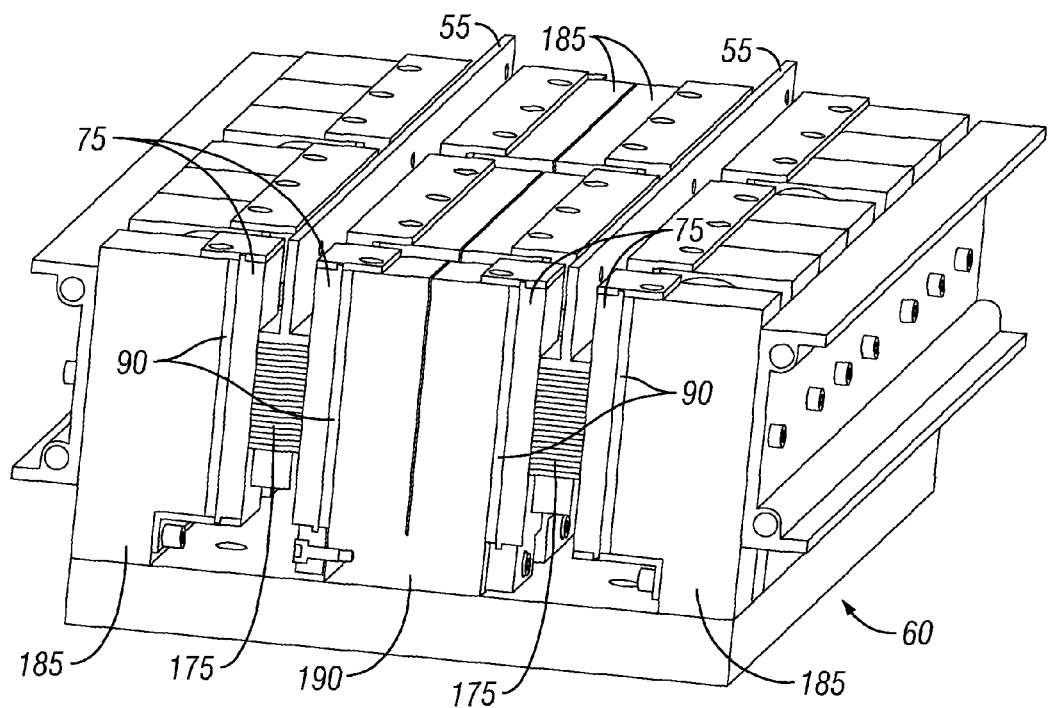
FIGS. 19-21 illustrate the coil assembly of FIG. 15 in a central position in the magnetic circuit in accordance with embodiments of the present invention.
Figure 20:
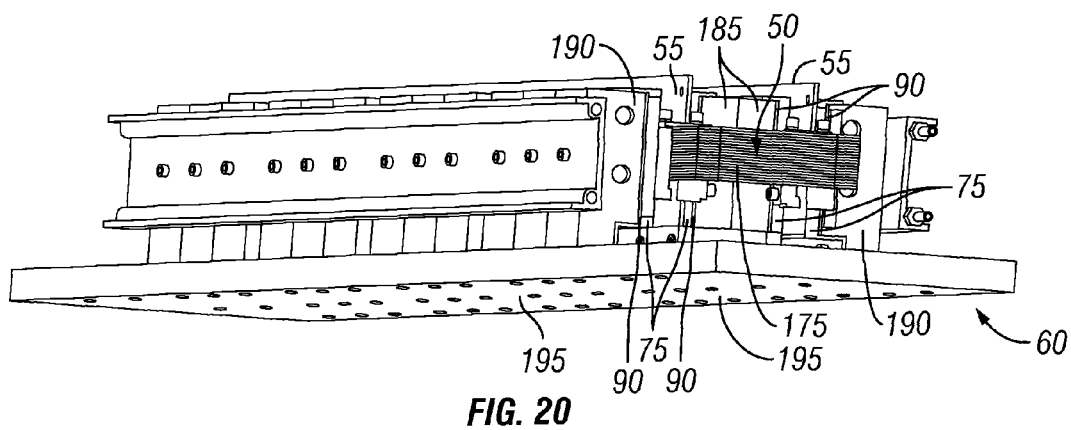
Figure 21:
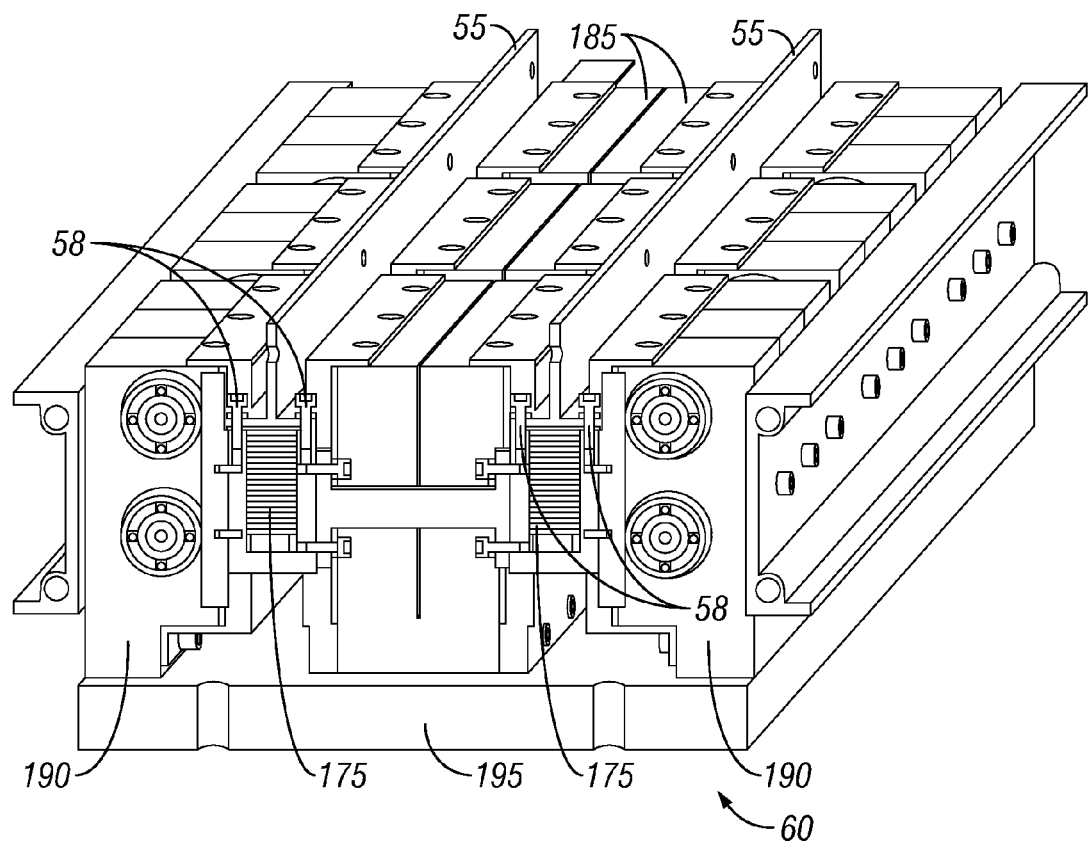
Figure 22:
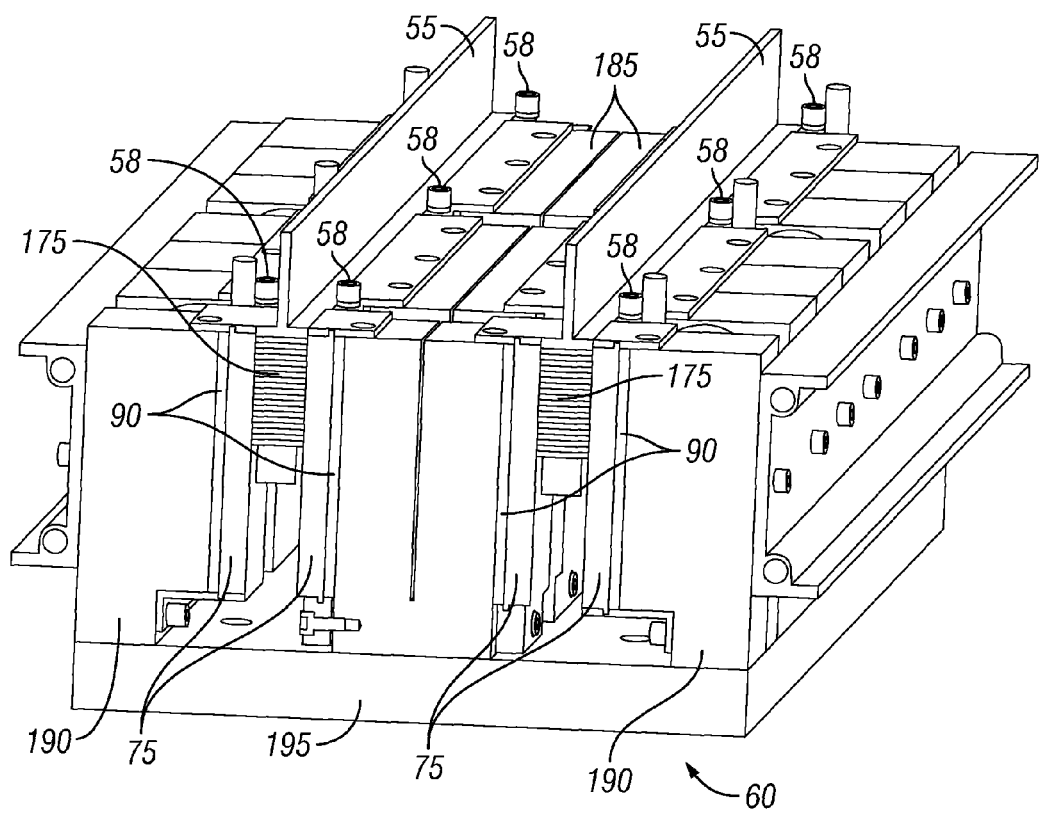
FIGS. 22 and 23 illustrate a cross-section of the coil assembly of FIG. 15 in an upper position in the magnetic circuit in accordance with embodiments of the present invention.
Figure 23:
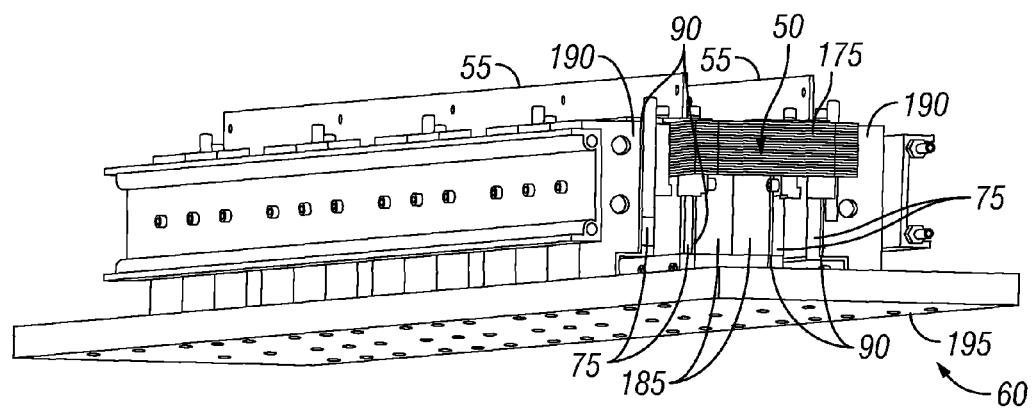

In accordance with embodiments of the present invention, the ferromagnetic coil 175 with integral extensions should cause the magnetic field generated by the permanent magnets 90 to substantially follow the ferromagnetic coil 175 as it moves through the gaps 62. FIGS. 17 and 18 illustrate the ferromagnetic coil 175 in its lower position in the magnetic circuitry 60. FIGS. 19-21 illustrate the ferromagnetic coil 175 in its central position in the magnetic circuitry 60. FIGS. 22 and 23 illustrate the ferromagnetic coil 175 in its central position in the magnetic circuitry 60.

Figure 24:
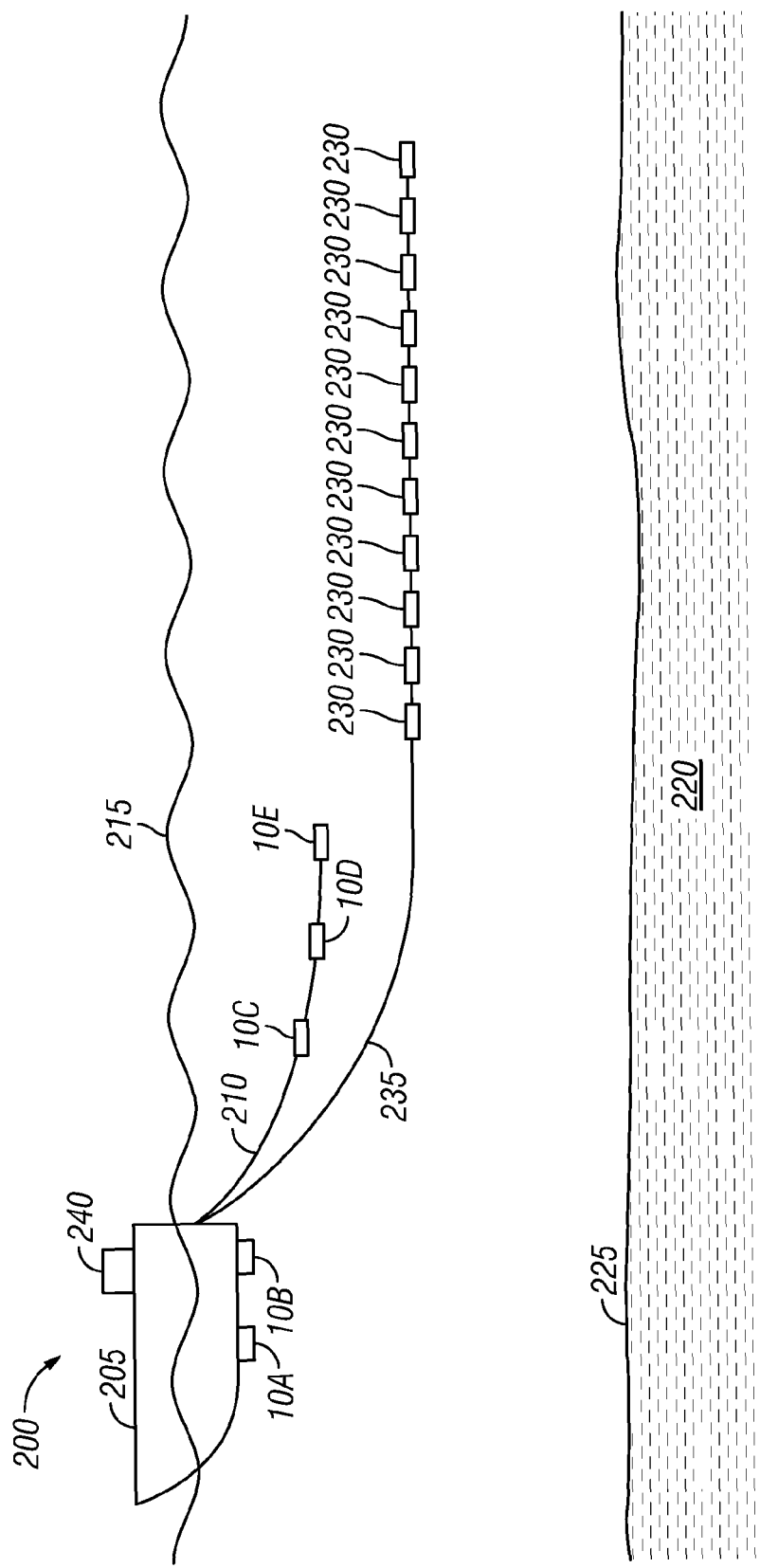
FIG. 24 illustrates an example of a marine seismic survey system using at least one acoustic vibratory source in accordance with embodiments of the present invention.

FIG. 24 illustrates a marine acquisition system 200 that can use one or more acoustic vibratory sources 10A-10E in accordance with embodiments of the present invention. Each of the acoustic vibratory sources 10A-10E shown in FIG. 24 may be mounted in a suitable housing for coupling to the hull of a survey vessel 205 (e.g., 10A and 10B) and/or for being towed at the end of a suitable cable 210 (e.g., 10C, 10D, and 10E). As illustrated, one or more of the acoustic vibratory sources 10A-10E may be at different depths in the body of water. For example, the acoustic vibratory sources 10C-10E attached to the cable 210 may be at a different depth than the acoustic vibratory sources 10A-10B mounted on the hull of the survey vessel 205. In addition, the acoustic vibratory sources 10C-10E on the cable 210 may be different depths with respect to one another. Examples of suitable housing structures are generally shown in U.S. Pat. No. 7,551,518 issued to Tenghamn. At least one of the acoustic vibratory sources 10A-10E may provide a source of seismic energy in the low frequency ranges, for example between about 0.001 Hz and about 100 Hz, alternatively, between about 0.1 Hz and about 10 Hz, and alternatively between about 0.5 Hz and 5 Hz. In some embodiments, the seismic energy provided by at least one of acoustic vibratory sources 10A-10E may be below about 5 Hz. In accordance with present embodiments, the survey vessel 205 can move along the surface 215 of a body of water, such as a lake or ocean. As energy is emitted by the acoustic vibratory sources 10A-10E, it travels downwardly through the water and rock formations 220 below the water bottom 225. Reflected energy may be detected by seismic sensors 230 disposed along one or more streamers 235 towed by the survey vessel 205 or another vessel. The type of seismic sensors 230 are not a limit on the scope of the present invention and may be hydrophones or other pressure responsive sensors, geophones, accelerometers or other motion respective sensors, or combinations thereof. Signals generated by the sensors may be communicated to equipment on the survey vessel 205, shown generally at 240 and referred to for convenience as "electrical equipment." The electrical equipment 240 typically includes devices (none shown separately) for navigating the survey vessel 205, for actuating the acoustic vibratory sources 10A-10E, for example, electrical controller with swept frequency alternating current or other signal, and for recording signals generated by the seismic sensors 230.

While the preceding description is directed to marine seismic surveying, those of ordinary skill in the art will appreciate that it may be desirable to use embodiments of the electromagnetic linear actuators for the generation of sound waves in other applications. Non-limiting examples of additional applications in which embodiments of the electromagnetic linear actuators may be used include a vibratory source in military applications (e.g., triggering of mines), a linear actuator in a loudspeaker, and a linear actuator for motion control in industrial applications, among others.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A linear actuator for acoustic sources, comprising:
   magnetic circuitry comprising a first gap; and
   a first coil assembly comprising:
      a drive coil, wherein at least a first portion of the drive coil is configured to be moved in a linear path in the first gap;
      a pair of ferromagnetic coil guides positioned on either side of the linear path;
      a first ferromagnetic extension extending laterally from the first portion of the drive coil; and
      a transmission element coupled to a top side of the first portion of the first drive coil.

2. The linear actuator of claim 1, wherein the first coil assembly comprises a second ferromagnetic extension extending laterally from the first portion of the drive coil opposite the first ferromagnetic extension.

3. The linear actuator of claim 1, wherein the ferromagnetic coil guides extend beyond the linear path of the first portion of the drive coil.

4. The linear actuator of claim 1, wherein the drive coil comprises a non-magnetic material.

5. The linear actuator of claim 1, wherein the first ferromagnetic extension is integral with the drive coil, the drive coil comprising a ferromagnetic material.

6. The linear actuator of claim 1, wherein at least a second portion of the drive coil is configured to be moved in a linear path in a second gap in the magnetic circuitry, and wherein one or more ferromagnetic extensions extend laterally from the second portion of the drive coil.

7. The linear actuator of claim 6 wherein the linear actuator further comprises a second coil assembly arranged on an opposing side of a symmetry line from the first coil assembly, and wherein the second coil assembly comprises:
   a drive coil, wherein at least a first portion of the drive coil is configured to be moved in a linear path in a third gap in the magnetic circuitry;
   a pair of ferromagnetic coil guides positioned on either side of the linear path;
   a ferromagnetic extension extending laterally from the first portion of the drive coil; and
   a transmission element coupled to a top side the first portion of the drive coil.

8. The linear actuator of claim 7, wherein at least a second portion of the drive coil of the second coil assembly is configured to be moved in a linear path in a fourth gap in the magnetic circuitry, and wherein one or more ferromagnetic extensions extend laterally from the second portion of the drive coil of the second coil assembly.

9. The linear actuator of claim 1, wherein the magnetic circuitry comprises permanent magnets, wherein the permanent magnets are disposed on either side of the first gap.

10. The linear actuator of claim 1, wherein the magnetic circuitry comprises parallel magnetic circuits.

11. The linear actuator of claim 1, wherein the magnetic circuitry comprises series connected magnetic circuits.

12. The linear actuator of claim 1, wherein a stroke length of the linear actuator is greater than a height of the drive coil.

13. An acoustic vibratory source, comprising:
   a flextensional shell defining a longer axis and a shorter axis; and a linear actuator coupled to the flextensional shell proximate an end of the shorter axis, wherein the linear actuator comprises:
magnetic circuitry comprising gaps;
a pair of opposing coil assemblies, wherein the coil assemblies each comprise:
a drive coil, wherein at least a portion of each of the drive coils is configured to be moved in a linear path in at least one of the gaps in the magnetic circuitry;
a first ferromagnetic extension extending laterally from the drive coil; and
a transmission element coupled to the drive coil.

14. The acoustic vibratory source of claim 13, wherein the acoustic vibratory source is configured to have a resonance frequency of below about 10 Hz when disposed in the water.

15. The acoustic vibratory source of claim 13, further comprising a fixture coupled to the linear actuator and coupled to the flextensional shell proximate an end of the longer axis, wherein the coil assemblies are arranged on opposing sides of the fixture.

16. The acoustic vibratory source of claim 13, wherein each of the coil assemblies comprises a second ferromagnetic extension extending laterally from the drive coil opposite the first ferromagnetic extension.

17. The acoustic vibratory source of claim 13, wherein the first ferromagnetic extension for each of the coil assemblies is integral with the corresponding drive coil, wherein each drive coil comprises a ferromagnetic material.

18. A marine seismic survey system, comprising:
a vessel;
an acoustic vibratory source coupled to the vessel, wherein the acoustic vibratory source comprises:
a flextensional shell defining a longer axis and a shorter axis; and
a linear actuator coupled to the flextensional shell proximate an end of the shorter axis, wherein the linear actuator comprises:
magnetic circuitry comprising gaps;
a pair of opposing coil assemblies, wherein the coil assemblies each comprise:
a drive coil, wherein at least a portion of the drive coil is configured to be moved in a linear path in at least one of the gaps in the magnetic circuitry;
a first ferromagnetic extension extending laterally from the drive coil; and
a transmission element coupled to the drive coil; and
an electrical controller capable of actuating the linear actuator.

19. The marine seismic survey system of claim 18, wherein the acoustic vibratory source is configured to have a resonance frequency of below about 10 Hz when disposed in the water.

20. The marine seismic survey system of claim 18, wherein each of the coil assemblies comprises a second ferromagnetic extension extending laterally from the drive coil opposite the first ferromagnetic extension.

21. The marine seismic survey system of claim 18, wherein the first ferromagnetic extension for each drive coil is integral with the corresponding drive coil, wherein the drive coil for each of the coil assemblies comprises a ferromagnetic material.

22. A method of marine seismic surveying, comprising:
towing a seismic sensor streamer with a vessel through a body of water over a subterranean formation;
controlling a first acoustic vibratory source to generate a first seismic signal, wherein the first acoustic vibratory source comprises:
a flextensional shell defining a longer axis and a shorter axis; and
a linear actuator coupled to the flextensional shell proximate an end of the shorter axis, wherein the linear actuator comprises:
magnetic circuitry comprising gaps;
a pair of opposing coil assemblies, wherein the coil assemblies each comprise:
a drive coil, wherein at least a portion of the drive coil is configured to be moved in a linear path in at least one of the gaps in the magnetic circuitry;
a first ferromagnetic extension extending laterally from the drive coil; and
a transmission element coupled to the drive coil;
allowing the first seismic signal to propagate through the body of water and the subterranean formation to provide a first modified seismic signal; and
detecting the first modified seismic signal with the seismic sensor streamer.

23. The method of claim 22, wherein the first acoustic vibratory source has a resonance frequency of below about 10 Hz when disposed in the water.

24. The method of claim 22, wherein each of the coil assemblies comprises a second ferromagnetic extension extending laterally from the drive coil opposite the first ferromagnetic extension.

25. The method of claim 22, wherein the ferromagnetic extension for each drive coil is integral with the corresponding drive coil, wherein the drive coil for each of the coil assemblies comprises a ferromagnetic material.

26. The method of claim 22, further comprising:
controlling a second acoustic vibratory source to generate a second seismic signal, wherein the second acoustic vibratory source is configured substantially the same as the first acoustic vibratory source;
allowing the second seismic signal to propagate through the body of water and the subterranean formation to provide a second modified seismic signal; and
detecting the second modified seismic signal with the seismic sensor streamer.

27. The method of claim 26, wherein the first and second seismic signals are generated substantially simultaneously.

28. The method of claim 26, wherein the first and second modified seismic signals are detected substantially simultaneously.

29. The method of claim 26, wherein the first and second modified acoustic vibratory sources disposed at different depths in the body of water.

* * * * *